US008629716B2

(12) United States Patent
Han et al.

(10) Patent No.: US 8,629,716 B2
(45) Date of Patent: Jan. 14, 2014

(54) MODULATOR, DEMODULATOR AND MODULATOR-DEMODULATOR

(75) Inventors: Dong Han, Singapore (SG); Yuanjin Zheng, Singapore (SG)

(73) Assignee: Agency for Science, Technology and Research, Connexis (SG)

( * ) Notice: Subject to any disclaimer, the term of this patent is extended or adjusted under 35 U.S.C. 154(b) by 43 days.

(21) Appl. No.: 13/119,823

(22) PCT Filed: Sep. 19, 2008

(86) PCT No.: PCT/SG2008/000360
§ 371 (c)(1),
(2), (4) Date: Jun. 9, 2011

(87) PCT Pub. No.: WO2010/033080
PCT Pub. Date: Mar. 25, 2010

(65) Prior Publication Data
US 2012/0032736 A1 Feb. 9, 2012

(51) Int. Cl.
*H03K 9/08* (2006.01)
(52) U.S. Cl.
USPC ........... 329/312; 329/300; 329/315; 329/317; 329/347; 375/320; 375/322; 375/334
(58) Field of Classification Search
USPC .......... 329/300, 312, 315, 317, 347; 375/320, 375/322, 334
See application file for complete search history.

(56) References Cited

U.S. PATENT DOCUMENTS

| | | | |
|---|---|---|---|
| 4,086,430 A | 4/1978 | Brown | |
| 4,170,764 A | 10/1979 | Salz et al. | |
| 4,429,406 A * | 1/1984 | Hale | 375/364 |
| 4,631,737 A | 12/1986 | Davis et al. | |
| 5,550,505 A | 8/1996 | Gaus, Jr. | |
| 5,913,155 A | 6/1999 | Tomiyama | |
| 5,949,280 A | 9/1999 | Sasaki | |
| 5,969,962 A * | 10/1999 | Gabor | 363/89 |
| 6,137,826 A | 10/2000 | Boesch | |
| 6,836,181 B2 | 12/2004 | Yoshida | |
| 6,934,167 B2 * | 8/2005 | Jang et al. | 363/21.02 |
| 7,043,222 B2 | 5/2006 | Wortel et al. | |
| 7,092,676 B2 | 8/2006 | Abdelgany et al. | |

(Continued)

OTHER PUBLICATIONS

Darabi, Ho. et al., *An Analog GFSK Modulator in 0.35-µm CMOS*, IEEE Journal of Solid-State Circuits, vol. 39, No. 12, (2004), pp. 2292-2296.

(Continued)

*Primary Examiner* — Arnold Kinkead
*Assistant Examiner* — Richard Tan
(74) *Attorney, Agent, or Firm* — Alston & Bird LLP

(57) ABSTRACT

A modulator, a demodulator and a modulator-demodulator are provided. A modulator includes a first intermediate signal processing path adapted to route a first intermediate signal; a second intermediate signal processing path adapted to route a second intermediate signal; a first amplifier coupled into the first intermediate signal processing path; a second amplifier coupled into the second intermediate signal processing path; and a chopper circuit coupled into the first intermediate signal processing path; wherein the chopper circuit is adapted to process the first intermediate signal in dependence on first baseband data; wherein the first amplifier is adapted to amplify the first intermediate signal processed by the chopper circuit in dependence on second baseband data; and wherein the second amplifier is adapted to amplify the second intermediate signal in dependence on the second baseband data.

23 Claims, 18 Drawing Sheets

(56) References Cited

U.S. PATENT DOCUMENTS

| | | | |
|---|---|---|---|
| 7,180,273 B2* | 2/2007 | Bocchiola et al. | 323/207 |
| 7,266,163 B2 | 9/2007 | Khorram et al. | |
| 7,359,453 B1 | 4/2008 | Hietala et al. | |
| 2005/0077840 A1* | 4/2005 | Kazanov et al. | 315/294 |
| 2007/0178866 A1 | 8/2007 | Beukema et al. | |
| 2007/0297533 A1 | 12/2007 | Chitrapu et al. | |
| 2009/0135629 A1* | 5/2009 | Mancebo del Castillo Pagola | 363/34 |

OTHER PUBLICATIONS

Kao, H. et al., *A Delay-Line Based GFSK Demodulator for Low-IF Receivers*, 2007 IEEE International Solid-State Circuits Conference, Sessions 4, RF Building Blocks, 4.6, pp. 88-89, 589.

Lee, T. et al., *A Mixed-Signal GFSK Demodulator for Bluetooth*, IEEE Transactions on Circuits and Systems—II: Express Briefs, vol. 53, No. 3, (2006), pp. 197-201.

Melly, T. et al., *A 1.2V, 433 MHz, 10dBm, 38% Global Efficiency FSK Transmitter Integrated in a Standard Digital CMOS Process*, IEEE 2000 Custom Integrated Circuits Conference, (2000), pp. 179-182.

Shuguang, H. et al., *A Mixed-Loop CMOS Analog GFSK Modulator With Turntable Modulation Index*, IEEE Transactions on Circuits and Systems—II. Express Briefs, vol. 54, No. 6, (2007), pp. 547-551.

Xia, B. et al., *A GFSK Demodulator for Low-IF Bluetooth Receiver*, IEEE Journal of Solid-State Circuits, vol. 38, No. 8, (2003), pp. 1397-1400.

* cited by examiner

MODULATOR, DEMODULATOR AND MODULATOR-DEMODULATOR

TECHNICAL FIELD

Embodiments relate generally to a modulator, a demodulator and a modulator-demodulator.

BACKGROUND

The increasing market of wireless personal area networks (WPAN) and wireless body area networks (WBAN) demands ultra low power low cost wireless transceivers. Although many different wireless transceivers have been developed, there are some common features required by these transceivers in physical layer, such as the amplitude shift keying (ASK), frequency shift keying (FSK), Gaussian frequency shift keying (GFSK) modulators and demodulators (modems).

In order to handle these common modulation schemes, the conventional wireless transceivers implement individual modems for each modulation scheme, and simply physically put them into one chip. The modulation schemes for the conventional wireless transceivers are hard switched, are not flexible and reconfigurable. Therefore, there is unavoidable waiting time for switching the modulation schemes. For example, some conventional data link modules, which have both the ASK demodulator and the FSK demodulator, use one control bit to power ON/OFF one of the demodulators to switch the required scheme. Hence, there is a waiting time for switching to the desired modulation scheme and initializing the demodulator.

Further, since the conventional transceivers simply hard switch individual modems, the design is not optimized as one reconfigurable multi-scheme modem, the chip area is large, and thus the cost is high.

Further, the individual modulators and demodulators in the conventional transceivers also consume high power and high cost. For example, for the widely used FSK and/or GFSK schemes, phase locked loop (PLL) based demodulator, digital based demodulator, delay line or delay locked loop (DLL) based demodulator, and I/Q frequency discriminator based demodulator are generally used. However, these demodulators consume high power and take up a large chip area. Therefore, these demodulators are not suitable for the new generation WPAN and WBAN applications.

Further, the conventional transceivers which use FSK and/or GFSK modulation scheme normally have only one channel communication. They do not perform multi-channel communication like the QAM modulation scheme. The channel efficiency and spectrum efficiency are not high.

Therefore, it is desirable to provide a modulator, a demodulator and a modulator-demodulator which can achieve zero delay time modulation scheme switching, multi-scheme reconfigurable modulation demodulation data link, low power consumption, small chip area, high phase accuracy, and dual-channel high channel efficiency complementary amplitude and frequency shift keying (CAFSK) communication.

SUMMARY

In an embodiment, there is provided a modulator including a first intermediate signal processing path adapted to route a first intermediate signal; a second intermediate signal processing path adapted to route a second intermediate signal; a first amplifier coupled into the first intermediate signal processing path; a second amplifier coupled into the second intermediate signal processing path; and a chopper circuit coupled into the first intermediate signal processing path; wherein the chopper circuit is adapted to process the first intermediate signal in dependence on first baseband data; wherein the first amplifier is adapted to amplify the first intermediate signal processed by the chopper circuit in dependence on second baseband data; and wherein the second amplifier is adapted to amplify the second intermediate signal in dependence on the second baseband data.

In another embodiment, there is provided a demodulator including an amplitude demodulating path adapted to route a carrier signal; a frequency demodulating path adapted to route the same carrier signal; a mode control unit coupled to an output terminal of the amplitude demodulating path and an output terminal of the frequency demodulating path; and a pulse-width modulator coupled into the frequency demodulating path; wherein the mode control unit is adapted to control different modes of demodulation; and wherein, when the demodulator is operated in a controllable weight amplitude frequency shift keying (CW-AFSK) mode, the mode control unit is adapted to control the pulse-width of the pulse-width modulator in dependence on an output signal of the amplitude demodulating path.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Exemplary embodiments of a modulator, a demodulator and a modulator-demodulator are described in detail below with reference to the accompanying figures. It will be appreciated that the exemplary embodiments described below can be modified in various aspects without changing the essence of the invention.

Figure 1:
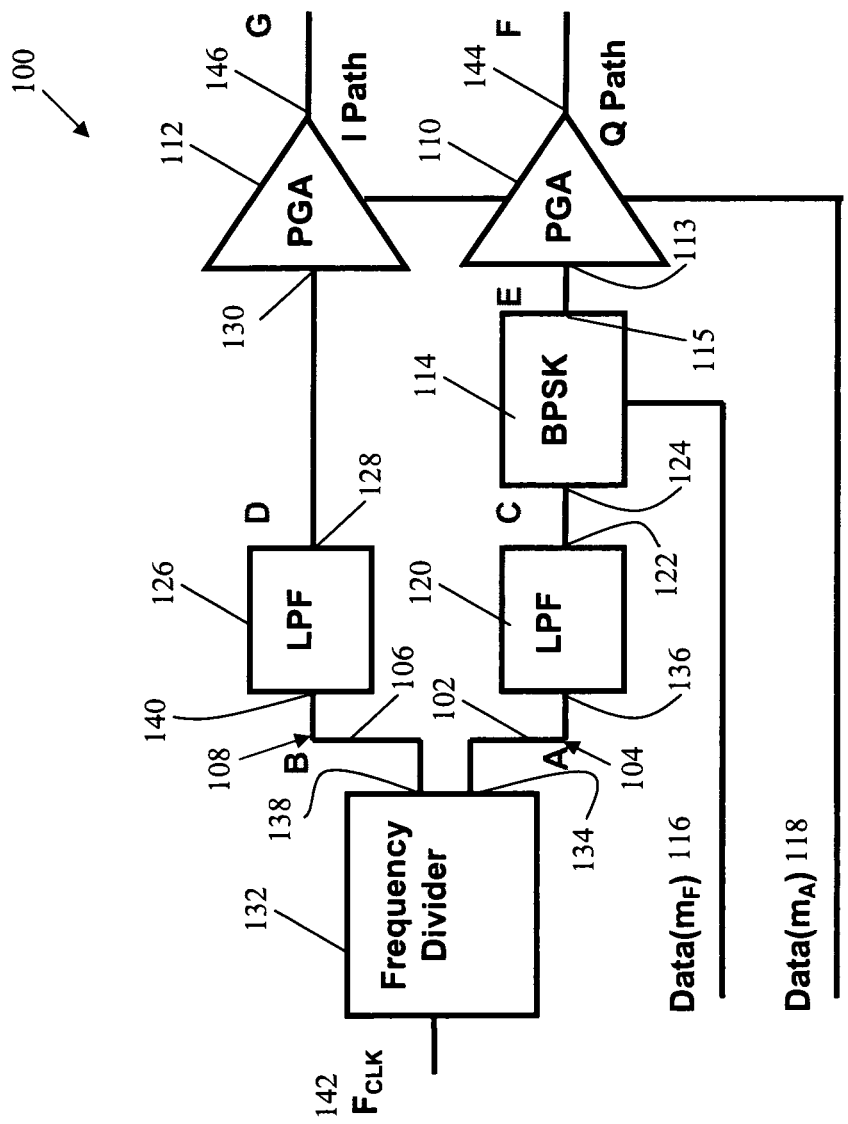
FIG. 1 shows a schematic diagram of a modulator.

FIG. 1 shows a schematic diagram of a modulator 100. The modulator 100 may be a complementary amplitude and frequency shift keying (CAFSK) modulator. The modulator 100 may also be a non-continuous phase (NCP) I/Q up-conversion based modulator.

The modulator 100 may include a first intermediate signal processing path 102 adapted to route a first intermediate signal 104 and a second intermediate signal processing path 106 adapted to route a second intermediate signal 108. The first intermediate signal processing path 102 may be a Q signal path and the second intermediate signal processing path 106 may be an I signal path.

A first amplifier 110 may be coupled into the first intermediate signal processing path 102. A second amplifier 112 may be coupled into the second intermediate signal processing path 106. The first amplifier 110 and the second amplifier 112 may be programmable gain amplifiers (PGAs).

A chopper circuit 114 may be coupled into the first intermediate signal processing path 102. An output terminal 113 of the chopper circuit 114 may be coupled to an input terminal 115 of the first amplifier 110. The chopper circuit 114 may be a differential binary phase shift keying (BPSK) modulator. The chopper circuit 114 may be adapted to process the first intermediate signal 104 in dependence on first baseband data 116. The first baseband data 116 may be baseband frequency shift keying data, $m_F$. The first baseband data (e.g. $m_F$) 116 may be provided to the chopper circuit 114. The first baseband data (e.g. $m_F$) 116 may control the chopper circuit 114.

The first amplifier 110 may be adapted to amplify the first intermediate signal 104 processed by the chopper circuit 114 in dependence on second baseband data 118. The second amplifier 112 may be adapted to amplify the second intermediate signal 108 in dependence on the second baseband data 118. The second baseband data 118 may be baseband amplitude shift keying data, $m_A$. The second baseband data (e.g. $m_A$) 118 may be provided to the first amplifier 110 and the second amplifier 112. The second baseband data (e.g. $m_A$) 118 may control gain $A(m_A)$ of the first amplifier 110 and gain $A(m_A)$ of the second amplifier 112. The gain $A(m_A)$ of the first amplifier 110 and the gain $A(m_A)$ of the second amplifier 112 may be represented as:

$$A(m_A) = \begin{cases} G_A, m_A = -1 \\ G_B, m_A = 1 \end{cases}$$

where $G_A > G_B$. The values of $G_A$ and $G_B$ may determine the amplitude shift keying (ASK) modulation depth $\bar{h}_A$ of the modulator 100.

The first intermediate signal processing path 102 may have a first filter 120. An output terminal 122 of the first filter 120 may be coupled to an input terminal 124 of the chopper circuit 114. The first filter 120 may be a low pass filter. The second intermediate signal processing path 106 may have a second filter 126. An output terminal 128 of the second filter 126 may be coupled to an input terminal 130 of the second amplifier 112. The second filter 126 may be a low pass filter. The first filter 120 and the second filter 126 may be the same type filter with same specification.

The modulator 100 may further include a frequency divider 132. A first output terminal 134 of the frequency divider 132 may be coupled to an input terminal 136 of the first filter 120. A second output terminal 138 of the frequency divider 132 may be coupled to an input terminal 140 of the second filter 126. The frequency divider 132 may be a current mode logic modular-2 frequency divider or a D flip flop frequency divider, which can provide quadrature complementary (positive and negative) outputs.

A signal 142 representing e.g. a reference clock, $F_{CLK}$ may be supplied to the frequency divider 132. The frequency divider 132 may divide the signal (e.g. $F_{CLK}$) 142, and may produce the first intermediate signal 104 and the second intermediate signal 108. An output frequency of the frequency divider 132 may be $F_{DF}$, which may be a deviation frequency of the final modulated FSK/CAFSK carrier signals. The value of $F_{DF}$ may determine the frequency shift keying (FSK) modulation index $\bar{h}_F$ of the modulator 100. The first intermediate signal 104 and the second intermediate signal 108 may be digital complementary (positive and negative) square waves with 90 degree phase difference. The first intermediate signal 104 may be Q complementary digital square waves at point A and the second intermediate signal 108 may be I complementary digital square waves at point B.

The first filter 120 may filter the Q complementary digital square waves 104. After filtering, the first intermediate signal 104 may be a Q differential sine shaped signal at point C of the first intermediate signal processing path 102. The second filter 126 may filter the I complementary digital square waves 108. After filtering, the second intermediate signal 108 may be an I differential sine shaped signal at point D of the second intermediate signal processing path 106. The chopper circuit 114 (e.g. differential BPSK modulator) may process (e.g. perform BPSK modulation) on the Q differential sine shaped signal 104. After processing, the first intermediate signal 104 may be represented as $m_F \cdot \sin(\omega_{DF} t + \phi)$ at point E of the first intermediate signal processing path 102.

The first amplifier 110 may amplify the Q differential sine shaped signal 104 processed by the chopper circuit 114. After amplification, the first intermediate signal 104 may be represented as $A(m_A) \cdot m_F \sin(\omega_{DF} t + \phi)$ at an output terminal 144 of the first amplifier 110, where $\omega_{DF} = 2\pi F_{DF}$, and $\phi$ is the initial phase. The second amplifier 112 may amplify the I differential sine shaped signal 108. After amplification, the second intermediate signal 108 may be represented as $A(m_A) \cdot \cos(\omega_{DF} t + \phi)$ at an output terminal 146 of the second amplifier 112.

Figure 2:
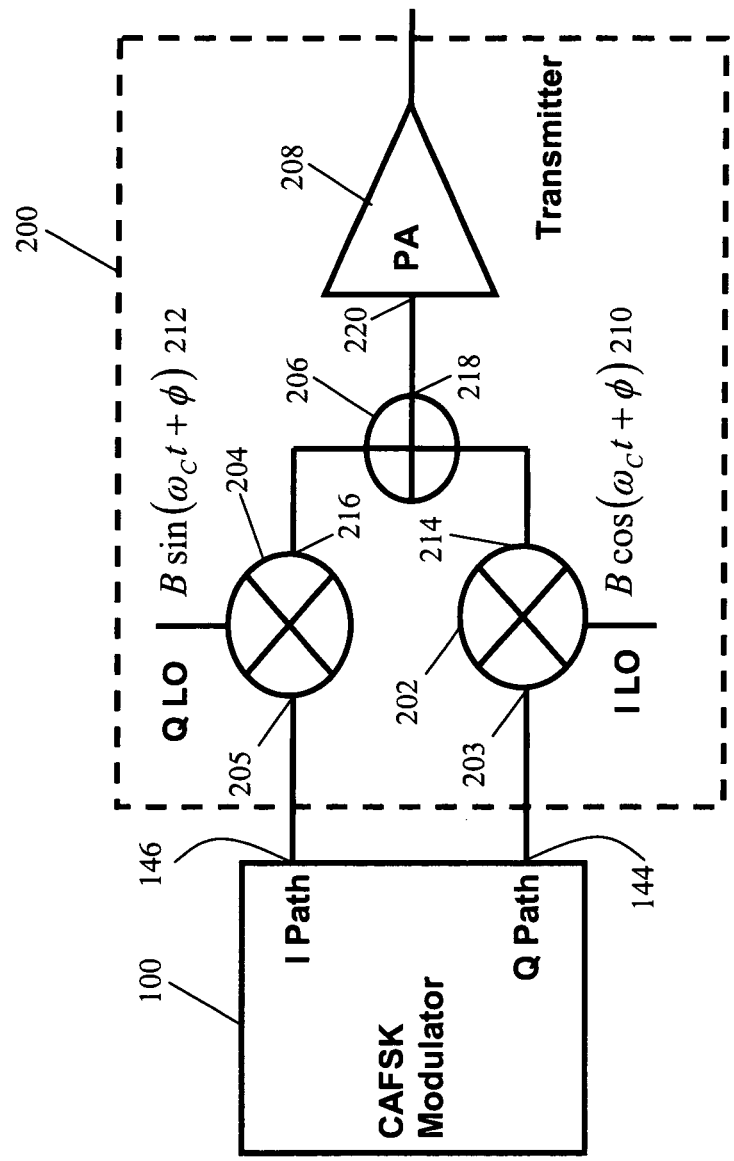
FIG. 2 shows a schematic diagram of the modulator coupled to a transmitter.

FIG. 2 shows a schematic diagram of the modulator 100 coupled to a transmitter 200. The transmitter 200 may be an I/Q transmitter. The transmitter 200 may include a first scaling device 202, a second scaling device 204, a summing device 206 and a power amplifier 208.

The first intermediate signal processing path 102 may include the first scaling device 202 coupled to the output terminal 144 of the first amplifier 110. An input terminal 203 of the first scaling device 202 may be coupled to the output terminal 144 of the first amplifier 110. The first scaling device 202 may be adapted to scale the first intermediate signal 104 amplified by the first amplifier 110. The first scaling device 202 may be adapted to scale the first intermediate signal 104 by multiplying the first intermediate signal 104 with an input signal 210 received by the first scaling device 202. The first scaling device 202 may be a first output of a local quadrature oscillator (LO). The input signal 210 may be an I LO signal. The input signal 210 may be represented as $B \cos(\omega_C t + \phi)$, where B is the LO amplitude, $\omega_C$ is the LO frequency, and $\phi$ is the LO initial phase.

The second intermediate signal processing path 106 may include the second scaling device 204 coupled to the output terminal 146 of the second amplifier 112. An input terminal 205 of the second scaling device 204 may be coupled to the output terminal 146 of the second amplifier 112. The second scaling device 204 may be adapted to scale the second intermediate signal 108 amplified by the second amplifier 112. The second scaling device 204 may be adapted to scale the second intermediate signal 108 by multiplying the second intermediate signal 108 with an input signal 212 received by the second scaling device 204. The second scaling device 204 may be a second output of a quadrature local oscillator (LO). The input signal 212 may be a Q LO signal. The input signal 212 may be represented as $B \sin(\omega_C t + \phi)$.

The summing device 206 may be coupled to an output terminal 214 of the first scaling device 202 and an output terminal 216 of the second scaling device 204. The summing device 206 may be adapted to combine the first intermediate signal 104 scaled by the first scaling device 202 and the second intermediate signal 108 scaled by the second scaling device 204. A combination of the first intermediate signal 104 and the second intermediate signal 108 may form a modulated signal s(t). An output terminal 218 of the summing device 206 may be coupled to an input terminal 220 of the power amplifier 208. The power amplifier 208 may be adapted to amplify the modulated signal s(t).

The modulated signal s(t) at the output terminal 218 of the summing device 206 may be calculated as indicated in the following:

$$s(t) = [A(m_A) \cdot m_F \cdot \sin(\omega_{DF} t + \phi) \cdot B \cos(\omega_C t + \phi)] + [A(m_A) \cdot \cos(\omega_{DF} t + \phi) \cdot B \sin(\omega_C t + \phi)] = A(m_A) \cdot B \cdot \sin((\omega_C t + \phi) + m_F(\omega_{DF} t + \phi))$$

$A(m_A)$ may represent the amplitude shift keying (ASK) modulation. $\sin((\omega_C t + \phi) + m_F(\omega_{DF} t + \phi))$ may represent the frequency shift keying (FSK) modulation.

The modulator 100 may be adapted to operate in different modes of modulation in dependence on the first baseband data (e.g. $m_F$) 116 and the second baseband data (e.g. $m_A$) 118. The modes of modulation may include one or more of a group consisting of amplitude shift keying (ASK) mode, frequency shift keying (FSK) mode, controllable weight amplitude frequency shift keying (CW-AFSK) mode, and dual channel amplitude frequency shift keying (DC-AFSK) mode.

When the modulator 100 is operated in the ASK mode, the first baseband data (e.g. $m_F$) 116 may have a constant value. When the modulator is operated in the FSK mode, the second baseband data (e.g. $m_A$) 118 may have a constant value. When the modulator is operated in the CW-AFSK mode, the first baseband data (e.g. $m_F$) 116 and the second baseband data (e.g. $m_A$) 118 may be the same or may be provided by one message source. The modulator 100 in the CW-AFSK mode may perform ASK, FSK and CAFSK modulation. When the modulator is operated in the DC-AFSK mode, the first baseband data (e.g. $m_F$) 116 and the second baseband data (e.g. $m_A$) 118 may have different values or may be provided by two message sources respectively. The modulator 100 in the DC-AFSK mode may perform both ASK and FSK modulation.

The first baseband data (e.g. $m_F$) 116 may have a value of 1 or −1. The first baseband data (e.g. $m_F$) 116 having a value of −1 may represent low frequency carrier signal. The first baseband data (e.g. $m_F$) 116 having a value of 1 may represent high frequency carrier signal. The second baseband data (e.g. $m_A$) 118 may have a value of 1 or −1. The second baseband data (e.g. $m_A$) 118 having a value of 1 may represent low amplitude carrier signal. The second baseband data (e.g. $m_A$) 118 having a value of −1 may represent high amplitude carrier signal.

Figure 3:
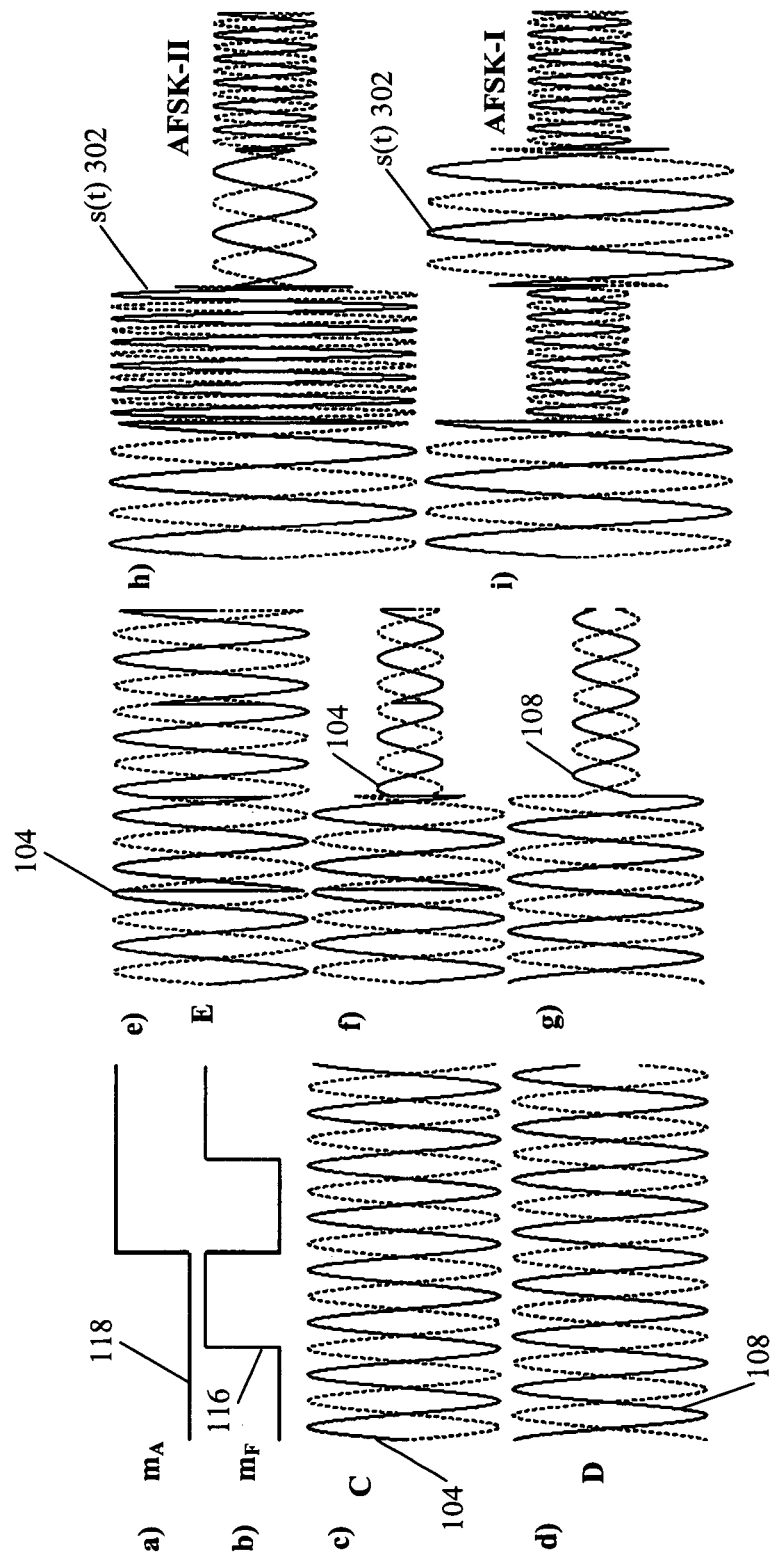
FIG. 3a shows an exemplary signal of second baseband data.
FIG. 3b shows an exemplary signal of first baseband data.
FIG. 3c shows a first intermediate signal processed by a first filter at point C of a first intermediate signal processing path.
FIG. 3d shows a second intermediate signal processed by a second filter at point D of a second intermediate signal processing path.
FIG. 3e shows the first intermediate signal processed by a chopper circuit at point E of the first intermediate signal processing path.
FIG. 3f shows the first intermediate signal amplified by a first amplifier at an output terminal of the first amplifier.
FIG. 3g shows the second intermediate signal amplified by a second amplifier at an output terminal of the second amplifier.
FIG. 3h shows the modulated signal s(t) under DC-AFSK mode (which may be referred to as AFSK-II signal), where the first baseband data and the second baseband data have different values.
FIG. 3i shows a modulated signal s(t) under CW-AFSK mode (which may be referred to as AFSK-I signal), where the first baseband data and the second baseband data have a same value.

FIG. 3a shows an exemplary signal of the second baseband data (e.g. $m_A$) 118. The second baseband data 118 may have a sequence of $m_A$=−1, −1, 1, 1. FIG. 3b shows an exemplary signal of the first baseband data (e.g. $m_F$) 116. The first baseband data 116 may have a sequence of $m_F$=−1, 1, −1, 1. FIG. 3c shows the first intermediate signal 104 processed by the first filter 120 (e.g. the Q differential sine shaped signal) at point C of the first intermediate signal processing path 102. FIG. 3d shows the second intermediate signal 108 processed by the second filter 126 (e.g. the I differential sine shaped signal) at point D of the second intermediate signal processing path 106. FIG. 3e shows the first intermediate signal 104 processed by the chopper circuit (e.g. BPSK modulator) 114 at point E of the first intermediate signal processing path 102. FIG. 3f shows the first intermediate signal 104 amplified by the first amplifier 110 at the output terminal 144 of the first amplifier 110. FIG. 3g shows the second intermediate signal 108 amplified by the second amplifier 112 at the output terminal 146 of the second amplifier 112.

FIG. 3h shows the modulated signal s(t) 302 under the DC-AFSK mode, where the first baseband data (e.g. $m_F$) 116 and the second baseband data (e.g. $m_A$) 118 have different values. The modulated signal s(t) 302 may be named as AFSK-II signal. The AFSK-II signal 302 may use different combinations of low amplitude (i.e. $m_A=1$), high amplitude (i.e. $m_A=-1$), low frequency (i.e. $m_F=-1$), and high frequency (i.e. $m_F=1$). For example, the sequence of the first baseband data (e.g. $m_F$) 116 and the second baseband data (e.g. $m_A$) 118 for the AFSK-II signal shown in FIG. 3h is $m_A, m_F=-1,-1$; $-1,1$; $1,-1$; $1,1$. The waveforms shown in FIGS. 3a to 3g are corresponding signals of the modulator 100 having the sequence of $m_A, m_F=-1,-1$; $-1,1$; $1,-1$; $1,1$.

FIG. 3i shows the modulated signal s(t) 302 under the CW-AFSK mode, where the first baseband data (e.g. $m_F$) 116 and the second baseband data (e.g. $m_A$) 118 have a same value. The modulated signal s(t) 302 may be named AFSK-I signal. The AFSK-I signal 302 may use a carrier signal with high amplitude and low frequency (i.e. $m_A=m_F=-1$), and/or may use a carrier signal with low amplitude and high frequency (i.e. $m_A=m_F=1$). For example, the sequence of the first baseband data (e.g. $m_F$) 116 and the second baseband data (e.g. $m_A$) 118 for the AFSK-I signal shown in FIG. 3i is $m_A=m_F=-1, 1, -1, 1$.

The mapping between the carrier signal and the baseband data can be changed by the gain $A(m_A)$ of the first amplifier 110 and the gain $A(m_A)$ of the second amplifier 112 and the interface between the modulator 100 and the transmitter 200.

The modulator 100 may be a non-continuous phase (NCP) modulator. When the first baseband data $m_F$ 116 or the second baseband data $m_A$ 118 changes its value, the signals shown in FIGS. 3e to 3g may have a phase jump because the processes of the chopper circuit (e.g. differential BPSK modulator) 114, the first amplifier 110 and the second amplifier 112 may be performed abruptly. The NCP modulator may be used as the modulator 100 in this embodiment because the design can be dedicated for ultra low power wireless personal area network (WPAN) and wireless body area network (WBAN) applications. If a continuous phase modulator is required, a baseband PLL based FSK modulator with amplitude control loop can be used to generate the required continuous phase ASK, FSK and AFSK signals.

Figure 4:
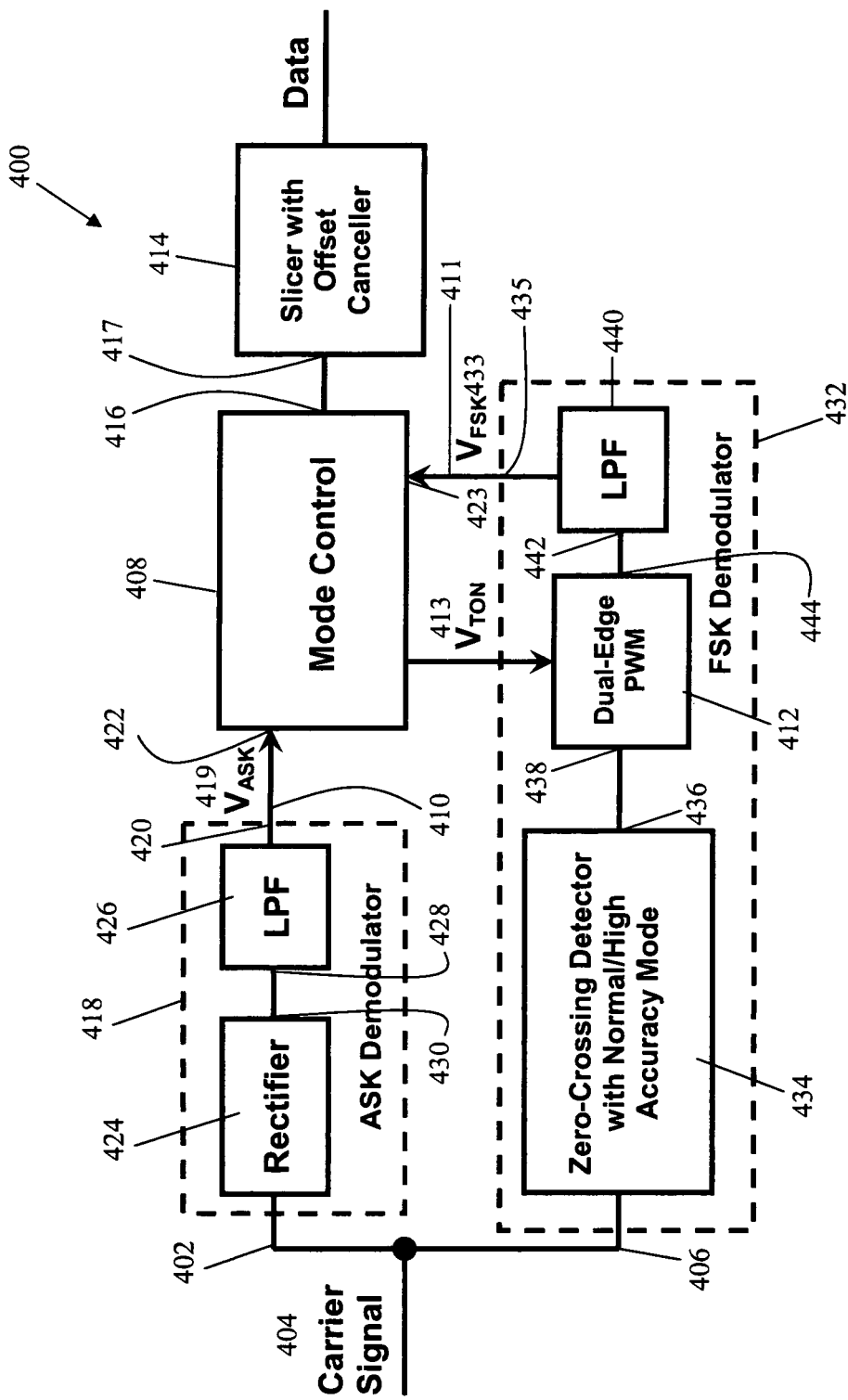
FIG. 4 shows a schematic diagram of a demodulator in one embodiment.

FIG. 4 shows a schematic diagram of a demodulator 400 in one embodiment. The demodulator 400 may be a complementary amplitude and frequency shift keying (CAFSK) demodulator. The demodulator 400 may be operable in different modes of demodulation. The demodulator 400 may include an amplitude demodulating path 402 adapted to route a carrier signal 404 and a frequency demodulating path 406 adapted to route the same carrier signal 404.

The demodulator 400 may include a mode control unit 408 coupled to an output terminal 410 of the amplitude demodulating path 402 and an output terminal 411 of the frequency demodulating path 406. The mode control unit 408 may be adapted to control the different modes of demodulation. The modes of demodulation may include one or more of a group consisting of amplitude shift keying (ASK) mode, frequency shift keying (FSK) mode, controllable weight amplitude frequency shift keying (CW-AFSK) mode and dual channel amplitude frequency shift keying (DC-AFSK) mode.

The demodulator 400 may also include a pulse-width modulator 412 coupled into the frequency demodulating path 406. The pulse-width modulator 412 may be a dual-edge pulse-width modulator. The pulse-width modulator 412 may be implemented by a digital logic circuit or a capacitor charge pump based one shot circuit. The pulse-width modulator 412 may generate a positive pulse at an output terminal 444 of the pulse-width modulator 412 once an edge transition is presented at an input terminal 438 of the pulse-width modulator 412. The pulse width $T_{ON}$ at the output terminal 444 of the pulse-width modulator 412 may be controlled by a signal $V_{TON}$ 413 (e.g. a pulse-width control signal) from the mode control unit 408.

The demodulator 400 may further include a slicer 414 coupled to an output terminal 416 of the mode control unit 408. The slicer 414 may have an efficient DC offset canceller, which can remove the DC offset at an input terminal 417 of the slicer 414. Hence, data decision processed at the slicer 414 may not be affected by carrier frequency offset and carrier amplitude drifting.

The efficient DC offset canceller of the slicer 414 may be implemented based on DC offset cancellation loop (DC offset feedback loop). Alternatively, the efficient DC offset canceller may be implemented based on dynamically setting a threshold of the slicer 414 to a mean value of an input signal of the slicer 414. The slicer 414 may have a peak detector (not shown) and a valley detector (not shown). The input signal of the slicer 414 may be supplied to the peak detector and the valley detector. The mean value of input signal of the slicer 414 may be an average signal of an output of the peak detector and an output of the valley detector.

The amplitude demodulating path 402 may include an amplitude shift keying demodulating unit 418. The amplitude shift keying demodulating unit 418 may provide a signal representing a carrier signal amplitude envelope $V_{ASK}$ 419. An output terminal 420 of the amplitude shift keying demodulating unit 418 may be coupled to a first input terminal 422 of the mode control unit 408. The amplitude shift keying demodulating unit 418 may also include a rectifier 424 and a filter 426. An input terminal 428 of the filter 426 may be coupled to an output terminal 430 of the rectifier 424. The rectifier 424 may be a full wave rectifier. The filter 426 may be a low pass filter. The amplitude shift keying demodulating unit 418 may have high accuracy (e.g. 6.7% modulation depth), high speed (e.g. 8 MHz input frequency), and wide input voltage range (e.g. 0.3V-1.5V).

The frequency demodulating path 406 may include a frequency shift keying demodulating unit 432. The frequency shift keying demodulating unit 432 may be a frequency to voltage converter. A frequency to voltage gain of the frequency shift keying demodulating unit 432 may be controlled by the signal $V_{TON}$ 413. The frequency shift keying demodulating unit 432 may convert a frequency of the carrier signal 404 into a signal representing a voltage $V_{FSK}$ 433. An output terminal 435 of the frequency shift keying demodulating unit 432 may be coupled to a second input terminal 423 of the mode control unit 408.

The frequency shift keying demodulating unit 432 may include the pulse-width modulator 412. The frequency shift keying demodulating unit 432 may further include a zero-crossing detector 434. An output terminal 436 of the zero-crossing detector 434 may be coupled to the input terminal 438 of the pulse-width modulator 412. The frequency shift keying demodulating unit 432 may also include a filter 440. The filter 440 may be a low pass filter. An input terminal 442 of the filter 440 may be coupled to the output terminal 444 of the pulse-width modulator 412. The frequency shift keying demodulating unit 432 may have high phase accuracy, and may require low power and low cost.

Figure 5:
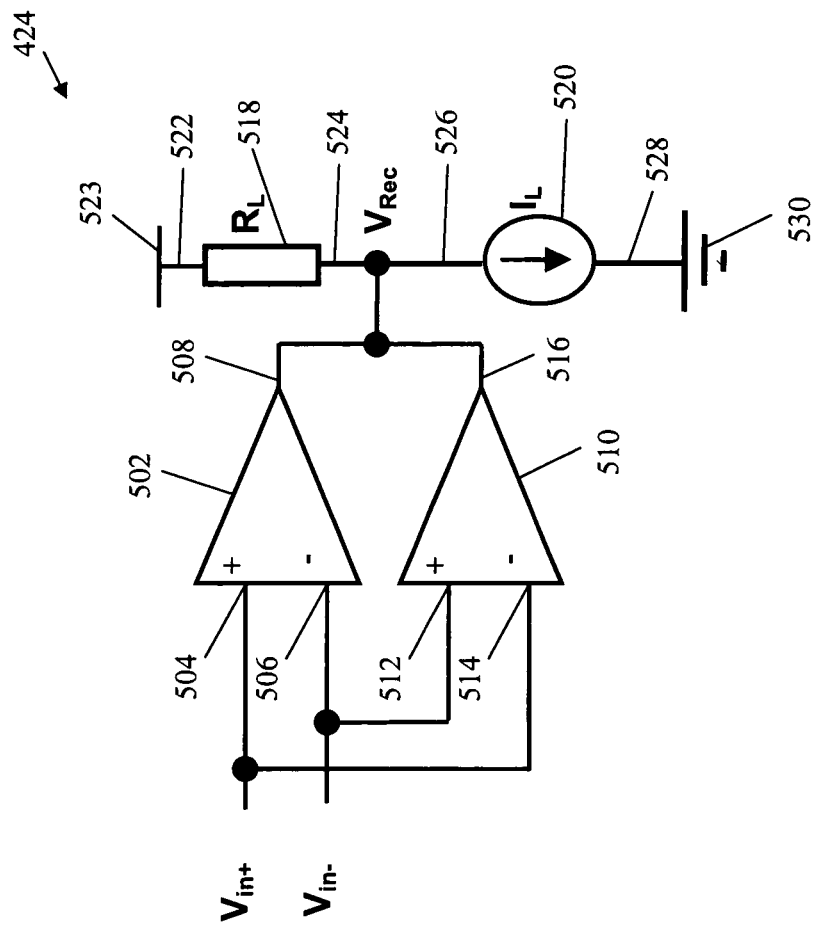
FIG. 5 shows a schematic diagram of one embodiment of a rectifier of an amplitude shift keying demodulating unit.

The rectifier 424 of the amplitude shift keying demodulating unit 418 may be implemented in several ways. FIG. 5 shows a schematic diagram of one embodiment of the rectifier 424 of the amplitude shift keying demodulating unit 418. The rectifier 424 may include a first half wave transconductance rectifier 502 having a first input terminal 504, a second input terminal 506, and an output terminal 508. The rectifier 424 may also include a second half wave transconductance rectifier 510 having a first input terminal 512, a second input terminal 514, and an output terminal 516.

The first input terminal 504 of the first half wave transconductance rectifier 502 may be coupled to the second input terminal 514 of the second half wave transconductance rectifier 510. A voltage $V_{in+}$ may be supplied to the first input terminal 504 of the first half wave transconductance rectifier 502 and the second input terminal 514 of the second half wave transconductance rectifier 510. The second input terminal 506 of the first half wave transconductance rectifier 502 may be coupled to the first input terminal 512 of the second half wave transconductance rectifier 510. A voltage $V_{in-}$ may be supplied to second input terminal 506 of the first half wave transconductance rectifier 502 and the first input terminal 512 of the second half wave transconductance rectifier 510. The output terminal 508 of the first half wave transconductance rectifier 502 may be coupled to the output terminal 516 of the second half wave transconductance rectifier 510. The first half wave transconductance rectifier 502 and the second half wave transconductance rectifier 510 with complementary inputs form the rectifier 424.

The output terminal 508 of the first half wave transconductance rectifier 502 and the output terminal 516 of the second half wave transconductance rectifier 510 may be coupled to the input terminal 428 of the filter 426 of the amplitude shift keying demodulating unit 418.

The rectifier 424 may further include a load resistor 518 and a load current source 520. The load resistor 518 may be used to convert an output current into voltage. The load current source may be used to adjust an output DC level. A first end 522 of the load resistor 518 may be coupled to a supply voltage 523 of the rectifier 424. The output terminal 508 of the first half wave transconductance rectifier 502 and the output terminal 516 of the second half wave transconductance rectifier 510 may be coupled to a second end 524 of the load resistor 518 and an input terminal 526 of the load current source 520. An output terminal 528 of the load current source 520 may be coupled to ground 530.

Figure 6:
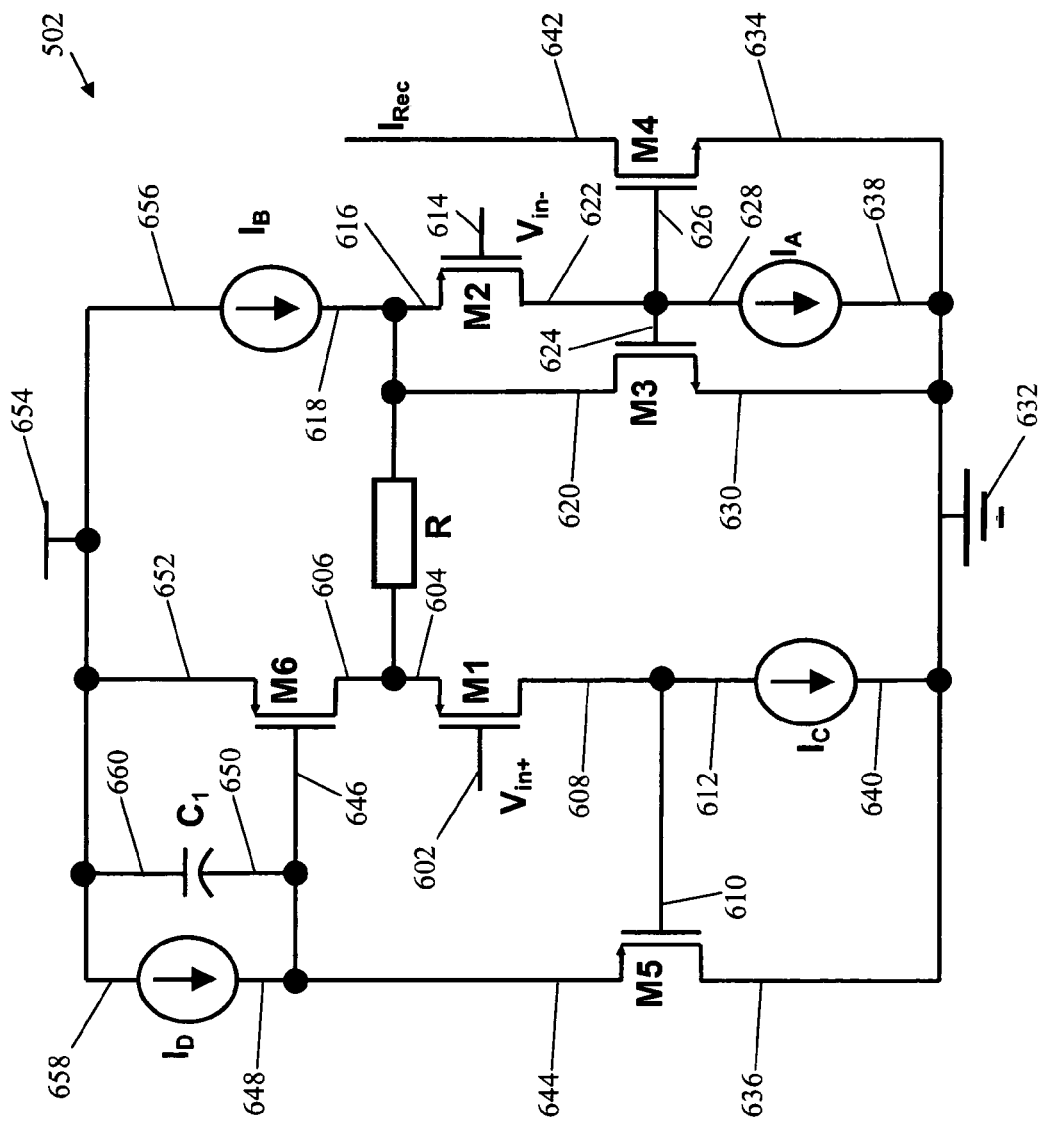
FIG. 6 shows a schematic diagram of a first half wave transconductance rectifier of the rectifier.

FIG. 6 shows a schematic diagram of the first half wave transconductance rectifier 502 of the rectifier 424. The first half wave transconductance rectifier 502 may include a first to sixth transistor (M1 to M6), a first to fourth source current ($I_A$ to $I_D$), a polarized capacitor ($C_1$) and a resistor (R). The first transistor (M1) may have a gate terminal 602 operable as the first input terminal 504 of the first half wave transconductance rectifier 502, a source terminal 604 coupled to a drain terminal 606 of the sixth transistor (M6), and a drain terminal 608 coupled to a gate terminal 610 of the fifth transistor (M5) and an input terminal 612 of the third current source ($I_C$). The second transistor (M2) may have a gate terminal 614 operable as the second input terminal 506 of the first half wave transconductance rectifier 502, a source terminal 616 coupled to an output terminal 618 of the second current source ($I_B$) and a drain terminal 620 of the third transistor (M3), and a drain terminal 622 coupled to a gate terminal 624 of the third transistor (M3), a gate terminal 626 of the fourth transistor (M4), an input terminal 628 of the first current source ($I_A$). The third transistor (M3) may have a source terminal 630 coupled to ground 632, a source terminal 634 of the fourth transistor (M4), a drain terminal 636 of the fifth transistor (M5), an output terminal 638 of the first current source ($I_A$) and an output terminal 640 of the third current source ($I_C$). The fourth transistor (M4) may have a drain terminal 642 operable as the output terminal 508 of the first half wave transconductance rectifier 502. The fifth transistor (M5) may have a source terminal 644 coupled to a gate terminal 646 of the sixth transistor (M6), an output terminal 648 of the fourth current source ($I_D$) and a negative polarity end 650 of the polarized capacitor ($C_1$). The sixth transistor (M6) may have a source terminal 652 coupled to a supply voltage 654 of the first half wave transconductance rectifier 502, an input terminal 656 of the second current source ($I_B$), an input terminal 658 of the fourth current source ($I_D$) and a positive polarity end 660 of the polarized capacitor ($C_1$). The resistor (R) may be coupled between the source terminal 604 of the first transistor (M1) and the drain terminal 620 of the third transistor (M3) and coupled to the source terminal 616 of the second transistor (M2).

Similarly, the second half wave transconductance rectifier 510 may be implemented in the same manner as the first half wave transconductance rectifier 502. The second half wave transconductance rectifier 510 may include a first to sixth transistor (M1 to M6), a first to fourth source current ($I_A$ to $I_D$), a polarized capacitor ($C_1$) and a resistor (R). The first transistor (M1) may have a gate terminal 602 operable as the first input terminal 512 of the second half wave transconductance rectifier 510, a source terminal 604 coupled to a drain terminal 606 of the sixth transistor (M6), and a drain terminal 608 coupled to a gate terminal 610 of the fifth transistor (M5) and an input terminal 612 of the third current source ($I_C$). The second transistor (M2) may have a gate terminal 614 operable as the second input terminal 514 of the second half wave transconductance rectifier 510, a source terminal 616 coupled to an output terminal 618 of the second current source ($I_B$) and a drain terminal 620 of the third transistor (M3), and a drain terminal 622 coupled to a gate terminal 624 of the third transistor (M3), a gate terminal 626 of the fourth transistor (M4), an input terminal 628 of the first current source ($I_A$). The third transistor (M3) may have a source terminal 630 coupled to ground 632, a source terminal 634 of the fourth transistor (M4), a drain terminal 636 of the fifth transistor (M5), an output terminal 638 of the first current source ($I_A$) and an output terminal 640 of the third current source ($I_C$). The fourth transistor (M4) may have a drain terminal 642 operable as the output terminal 516 of the second half wave transconductance rectifier 510. The fifth transistor (M5) may have a source terminal 644 coupled to a gate terminal 646 of the sixth transistor (M6), an output terminal 648 of the fourth current source ($I_D$) and a negative polarity end 650 of the polarized capacitor ($C_1$). The sixth transistor (M6) may have a source terminal 652 coupled to a supply voltage 654 of the second half wave transconductance rectifier 510, an input terminal 656 of the second current source ($I_B$), an input terminal 658 of the fourth current source ($I_D$) and a positive polarity end 660 of the polarized capacitor ($C_1$). The resistor (R) may be coupled between the source terminal 604 of the first transistor (M1) and the drain terminal 620 of the third transistor (M3) and coupled to the source terminal 616 of the second transistor (M2).

For both the first half wave transconductance rectifier 502 and the second half wave transconductance rectifier 510 of the rectifier 424, the first current source ($I_A$), the second current source ($I_B$) and the third current source ($I_C$) may have the same current. Further, the fifth transistor (M5), the sixth transistor (M6) and the fourth current source ($I_D$) may form a flipped voltage follower. The sixth transistor (M6) may provide dynamic current to the first transistor (M1) and the resistor (R). The first transistor (M1) and the second transistor (M2) may be matched transistors. The third transistor (M3) and the fourth transistor (M4) may be matched current mirror.

When the voltage $V_{in+}$ and the voltage $V_{in-}$ have the same potential, there may not be net current across the resistor (R). Therefore, no current may flow through the third transistor (M3) and the fourth transistor (M4). When the voltage $V_{in+}$ has a higher voltage than the voltage $V_{in-}$, the third transistor (M3) may detect the current flowing through the resistor (R), and may then mirror it out. The current may be represented as $$I_{Rec} = \frac{V_{in+} - V_{in-}}{R}.$$

When the voltage $V_{in+}$ has a lower voltage than the voltage $V_{in-}$, the third transistor (M3) and the fourth transistor (M4) may be turned off. No current may be flowing through the third transistor (M3) and the fourth transistor (M4) since the first current source ($I_A$) and the second current source ($I_B$) have the same current. Thus, the third transistor (M3) may only have current flowing through it during the positive half cycle of the voltage $V_{in+}$.

Figure 7:
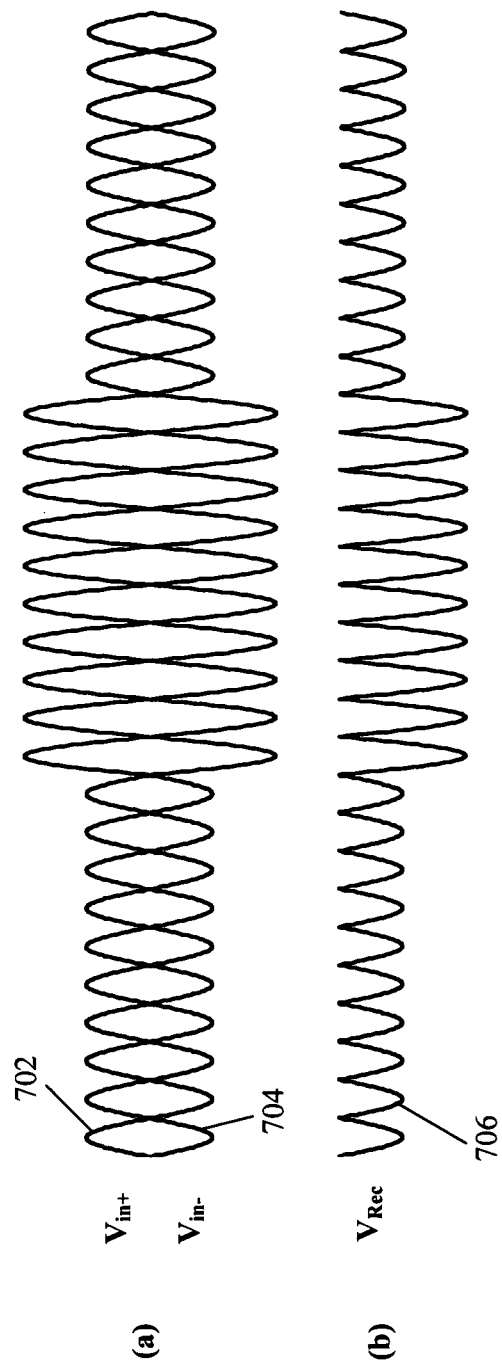
FIG. 7a shows a waveform of an input voltage $V_{in+}$ and a waveform of an input voltage $V_{in-}$.
FIG. 7b shows a waveform of an output voltage $V_{Rec}$ of the rectifier.

FIG. 7a shows a waveform 702 of an input voltage $V_{in+}$ and a waveform 704 of an input voltage $V_{in-}$. FIG. 7b shows a waveform 706 of an output voltage $V_{Rec}$ of the rectifier 424.

Referring back to FIG. 4, the zero-crossing detector 434 of the frequency shift keying demodulating unit 432 may be operable in a plurality of accuracy modes (e.g. a first accuracy mode and a second accuracy mode). The first accuracy mode may be a normal accuracy mode, which may use I/Q zero-crossing detection technique. The second accuracy mode may be a high accuracy mode, which may use instant phase zero-crossing detection technique. The zero-crossing detector 434 may be operable in the first accuracy mode when the demodulator is operable in FSK, CW-AFSK and DC-AFSK modes. The zero-crossing detector 434 may be operable in the second accuracy mode when the demodulator 400 is operable in FSK mode for small modulation index demodulation. In the FSK mode, the demodulator 400 may demodulate FSK or Gaussian frequency shift keying (GFSK) signal with small modulation index $\bar{h}_F$. The small modulation index $\bar{h}_F$ may have a minimum value of 0.2. For comparison, the Bluetooth standard have a modulation index $\bar{h}_F$ of 0.28~0.35.

Figure 8:
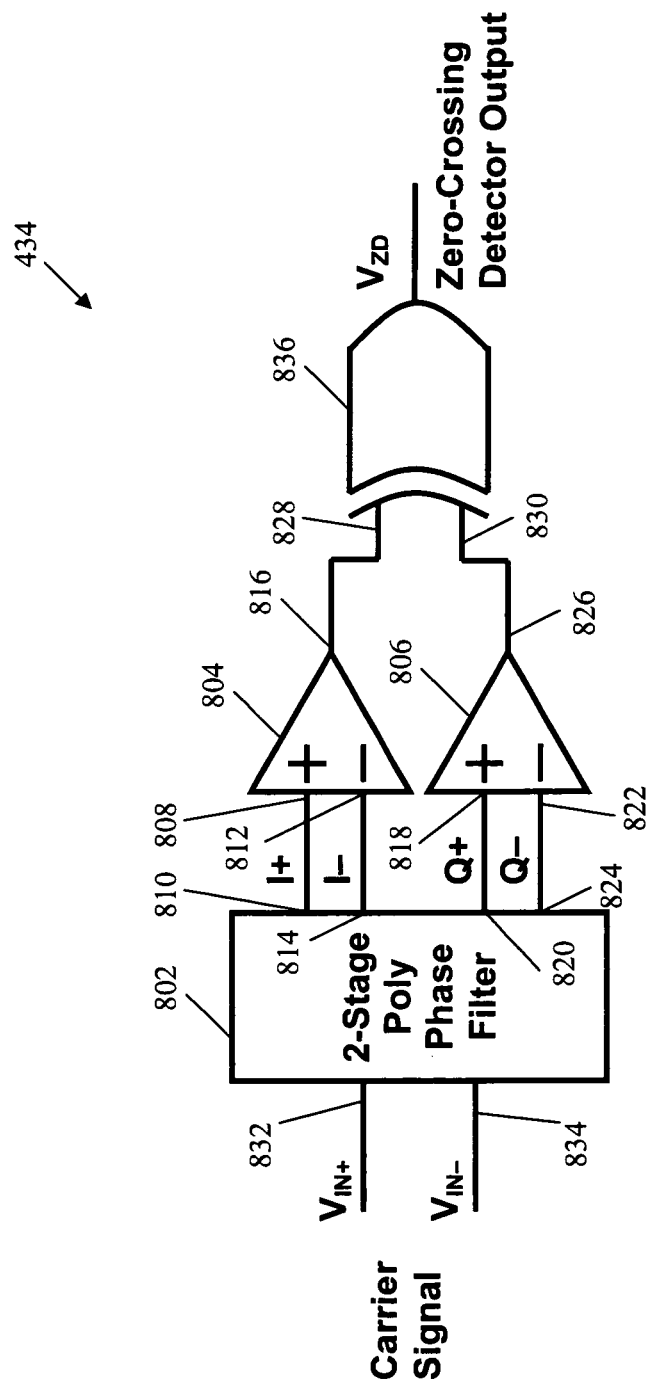
FIG. 8 shows a schematic diagram of a zero-crossing detector in a first accuracy mode.

FIG. 8 shows a schematic diagram of the zero-crossing detector 434 in the first accuracy mode. In the first accuracy mode, the zero-crossing detector may use a filter bank 802, a first comparator 804, a second comparator 806 and a XOR gate 836. The filter bank 802 may be a two-stage poly phase filter.

The first comparator 804 may have a first input terminal 808 coupled to a first output terminal 810 of the filter bank 802, a second input terminal 812 coupled to a second output terminal 814 of the filter bank 802, and an output terminal 816. The second comparator 806 may have a first input terminal 818 coupled to a third output terminal 820 of the filter bank 802, a second input terminal 822 coupled to a fourth output terminal 824 of the filter bank 802, and an output terminal 826. The XOR gate 836 may have a first input terminal 828 coupled to the output terminal 816 of the first comparator 804 and a second input terminal 830 coupled to the output terminal 826 of the second comparator 806.

An input differential carrier signals $V_{IN+}$ may be supplied to a first input terminal 832 of the filter bank 802 and an input differential carrier signal $V_{IN-}$ may be supplied to a second input terminal 834 of the filter bank 802. The filter bank 802 may convert the input differential carrier signals $V_{IN+}$ and $V_{IN-}$ into four output I/Q differential signals I+, I−, Q+, Q−. Zero-crossing may be performed on the output I differential signals I+ and I− in both I paths between the first output terminal 810 of the filter bank 802 and the first input terminal 808 of the first comparator 804 and between the second output terminal 814 of the filter bank 802 and the second input terminal 812 of the first comparator 804 respectively. Zero-crossing may be performed on the output Q differential signals Q+ and Q− in both Q paths between the third output terminal 820 of the filter bank 802 and the first input terminal 818 of the second comparator 806 and between the fourth output terminal 824 of the filter bank 802 and the second input terminal 822 of the second comparator 806 respectively. An output of the first comparator 804 and an output of the second comparator 806 may be supplied to and combined by the XOR gate 836.

Figure 9:
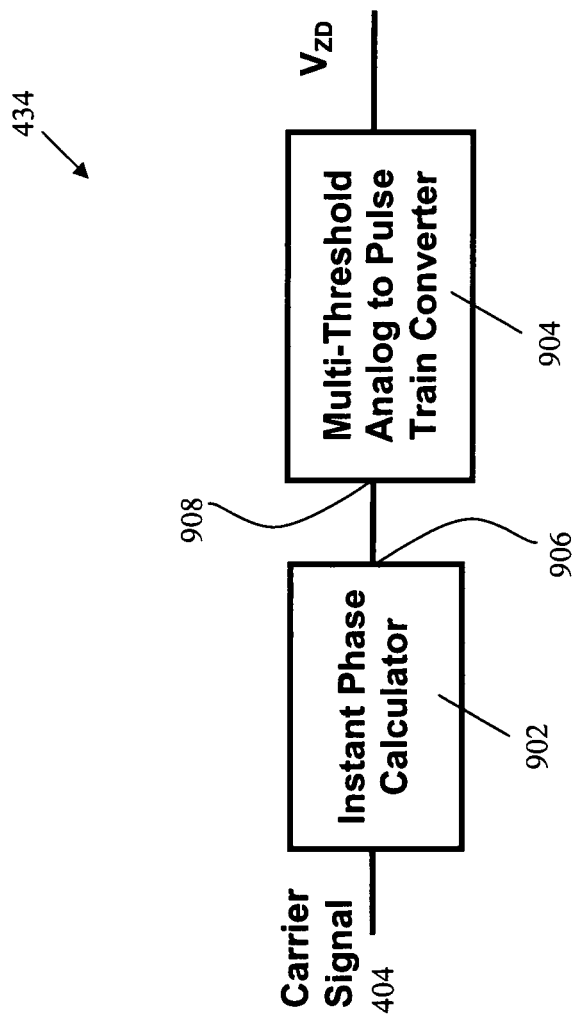
FIG. 9 shows a schematic diagram of the zero-crossing detector in a second accuracy mode.

FIG. 9 shows a schematic diagram of the zero-crossing detector 434 in the second accuracy mode. In the second accuracy mode, the zero-crossing detector may use an instant phase calculator 902 and an analog-to-pulse train converter (APTC) 904. An output terminal 906 of the instant phase calculator 902 may be coupled to an input terminal 908 of the APTC 904. The instant phase calculator 902 may be used to convert the carrier signal 404 into a phase of the carrier signal 404. The APTC 904 may digitalize the calculated phase and may convert the digital result into a pulse train.

Figure 10:
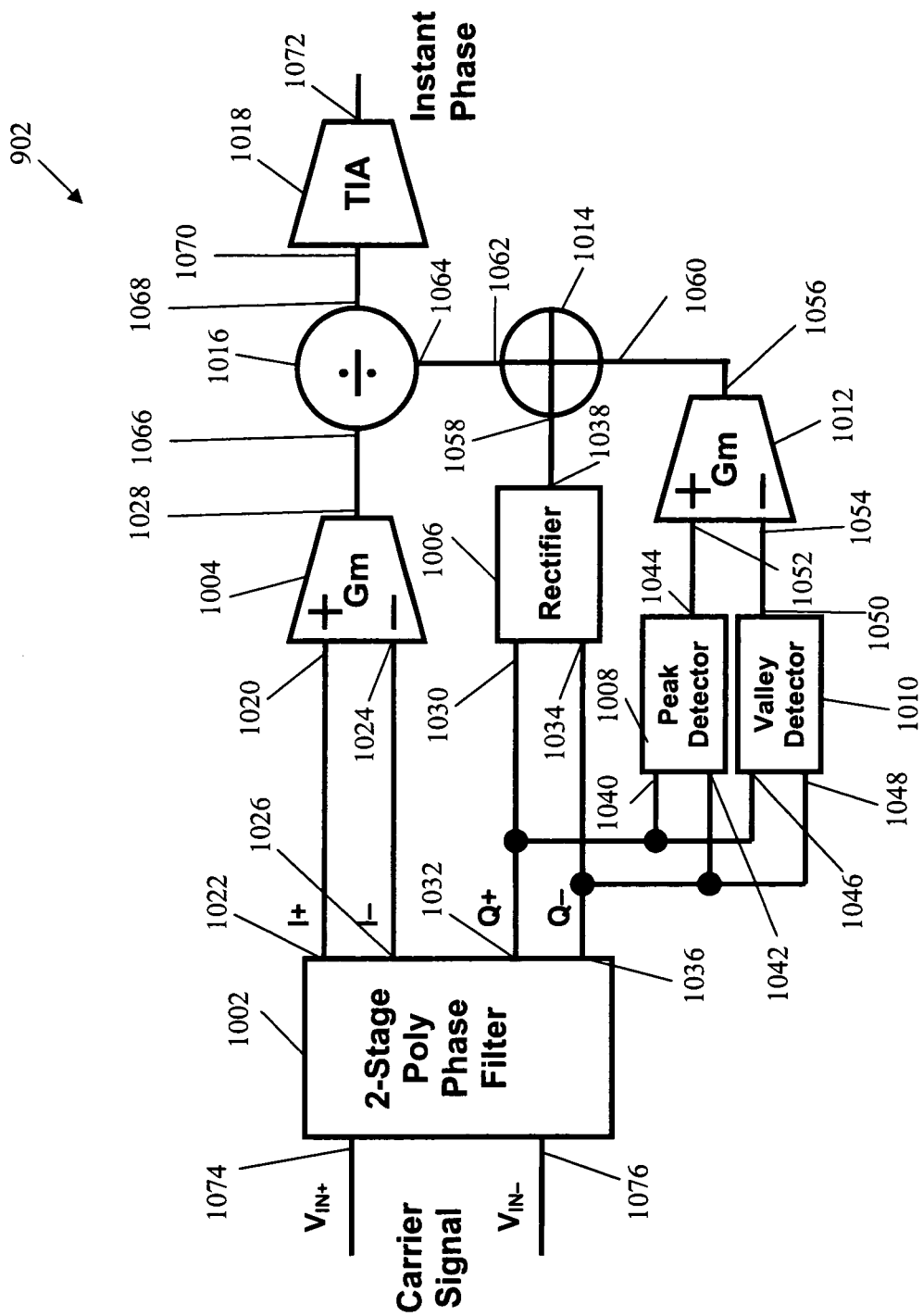
FIG. 10 shows a schematic diagram of an instant phase calculator used by the zero-crossing detector in the second accuracy mode.

FIG. 10 shows a schematic diagram of the instant phase calculator 902 used by the zero-crossing detector 434 in the second accuracy mode. The instant phase calculator 902 may include a filter bank 1002. The filter bank 1002 may be a two-stage poly phase filter. The filter bank 1002 may be the filter bank 802 used by the zero-crossing detector 434 in the first accuracy mode. The instant phase calculator 902 may include a first transconductor 1004, a rectifier 1006, a peak detector 1008, a valley detector 1010, a second transconductor 1012, a summing device 1014, a scaling device 1016 and a transimpedance amplifier (TIA) 1018.

The first transconductor 1004 may have a first input terminal 1020 coupled to a first output terminal 1022 of the filter bank 1002, a second input terminal 1024 coupled to a second output terminal 1026 of the filter bank 1002, and an output terminal 1028.

The rectifier 1006 may have a first input terminal 1030 coupled to a third output terminal 1032 of the filter bank 1002, a second input terminal 1034 coupled to a fourth output terminal 1036 of the filter bank 1002, and an output terminal 1038. The rectifier 1006 may be a full wave transconductance rectifier. The rectifier 1006 may be implemented by the circuits shown in FIGS. 5 and 6.

The peak detector 1008 may have a first input terminal 1040 coupled to the third output terminal 1032 of the filter bank 1002, a second input terminal 1042 coupled to the fourth output terminal 1036 of the filter bank 1002, and an output terminal 1044. The valley detector 1010 may have a first input terminal 1046 coupled to the third output terminal 1032 of the filter bank 1002, a second input terminal 1048 coupled to the fourth output terminal 1036 of the filter bank 1002, and an output terminal 1050. The second transconductor 1012 may have a first input terminal 1052 coupled to the output terminal 1044 of the peak detector 1008, a second input terminal 1054 coupled to the output terminal 1050 of the valley detector 1010, and an output terminal 1056.

The summing device 1014 may have a first input terminal 1058 coupled to the output terminal 1038 of the rectifier 1006, a second input terminal 1060 coupled to the output terminal 1056 of the second transconductor 1012, and an output terminal 1062. The summing device 1014 may be adapted to combine an output signal of the rectifier 1006 and an output signal of the second transconductor 1012.

The scaling device 1016 may have a first input terminal 1064 coupled to the output terminal 1062 of the summing device 1014, a second input terminal 1066 coupled to the output terminal 1028 of the first transconductor 1004, and an output terminal 1068. The scaling device 1016 may be adapted to divide an output signal of the first transconductor 1004 by an output signal of the summing device 1014. The TIA 1018 may have an input terminal 1070 coupled to the output terminal 1068 of the scaling device 1016. An output terminal 1072 of the TIA 1018 may be coupled to the input terminal 908 of the APTC 904.

For example, if a sine signal $V_A \sin(\omega t+\phi)$ is a signal supplied to the instant phase calculator 902, an instant phase of the sine signal can be calculated using the following formula:

$$\omega t + \varphi = \frac{\pi}{2} \frac{V_A \sin(\omega t + \varphi)}{V_A + 0.592 \cdot V_A |\cos(\omega t + \varphi)|}.$$

The above formula may be implemented by a circuit e.g. as shown in FIG. 10.

An input differential carrier signals $V_{IN+}$ may be supplied to a first input terminal 1074 of the filter bank 1002 and an input differential carrier signal $V_{IN-}$ may be supplied to a second input terminal 1076 of the filter bank 1002. The filter bank 1002 may convert the input differential carrier signals $V_{IN+}$ and $V_{IN-}$ into four output I/Q differential signals I+, I−, Q+, Q−. The I+ and I− signals may be supplied to the first transconductor 1004. The first transconductor 1004 may convert the I+ and I− signals into a current, which represents a numerator of the scaling device 1016. The Q+ and Q− signals may be supplied to the rectifier 1006. The rectifier 1006 may convert the Q+ and Q− signals into an absolute function. The Q+ and Q− signals may be supplied to the peak detector 1008 and the valley detector 1010. An output of the peak detector 1008 and an output of the valley detector 1010 may be supplied to the second transconductor 1012. The second transconductor 1012 may generate a constant $V_A$, which represents part of a denominator of the scaling device 1016. The scaling device 1016 may be a current divider. The scaling device 1016 may divide the current by the summation of the rectifier 1006 output and the second transconductor 1012 output. The transimpedance amplifier (TIA) 1018 may convert the current output of the scaling device 1016 into voltage, which may represent the instant phase of the input carrier signal 404.

Figure 11:
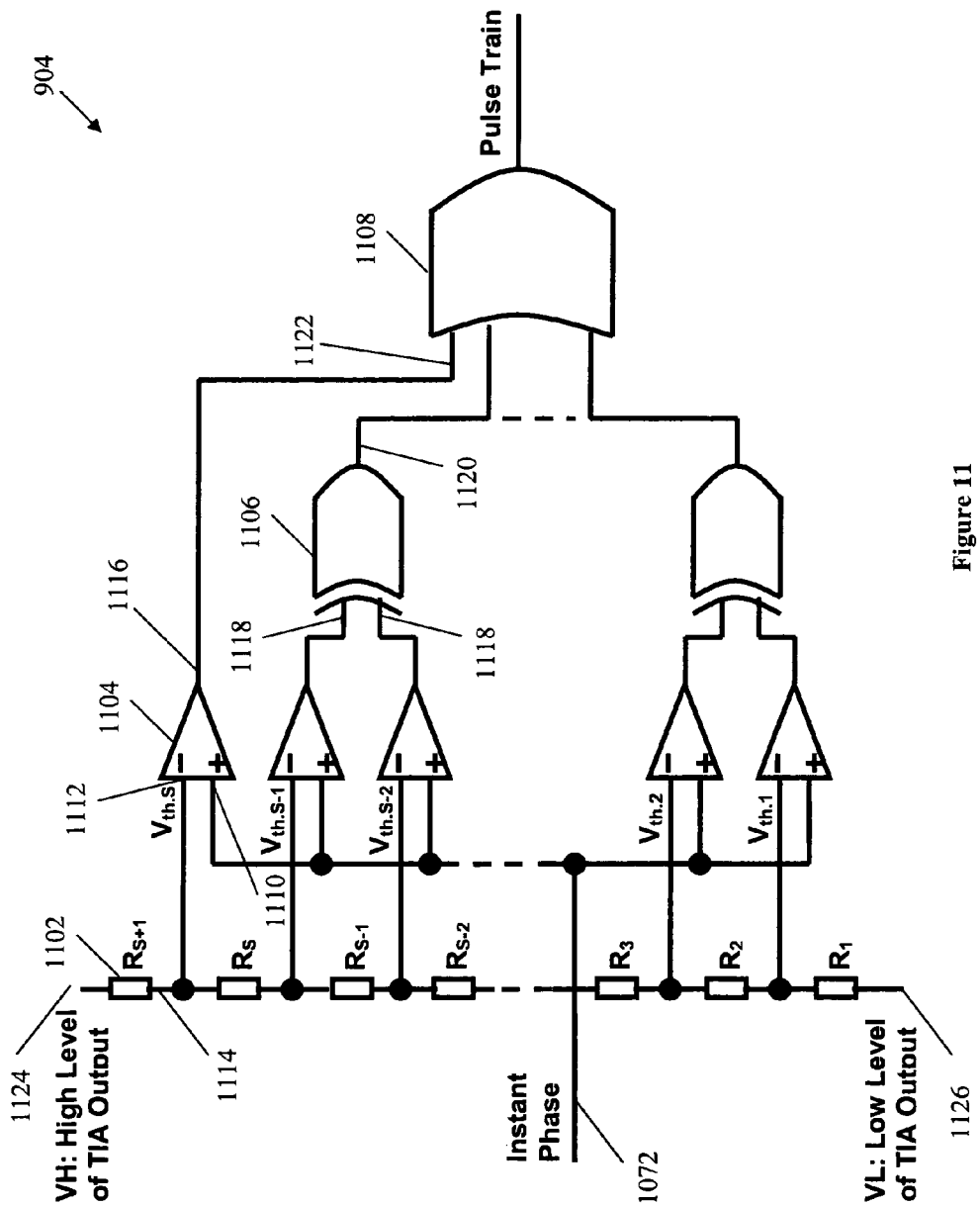
FIG. 11 shows a schematic diagram of an analog to pulse train converter used by the zero-crossing detector in the second accuracy mode.

FIG. 11 shows a schematic diagram of the analog to pulse train converter 904 used by the zero-crossing detector 434 in the second accuracy mode. The analog to pulse train converter 904 may include a plurality of resistors 1102, a plurality of comparators 1104, a plurality of XOR gates 1106 and an OR gate 1108. The plurality of resistors 1102 may be connected in series. In this embodiment, the number of resistors 1102 may be odd.

Each comparator 1104 of the plurality of comparators 1104 may have a first input terminal 1110 coupled to the output terminal 1072 of the transimpedance amplifier (TIA) 1018 and a second input terminal 1112 coupled to an individual connection 1114 connecting two adjacent resistors 1102 of the plurality of resistors 1102, and an output terminal 1116.

Each XOR gate 1106 of the plurality of XOR gates 1106 may have two input terminals 1118 and one output terminal 1120. The two input terminals 1118 of each XOR gate 1106 may be coupled to output terminals 1116 of two adjacent comparators 1104. Each input terminal 1122 of an OR gate 1108 may be coupled to the output terminal 1120 of one of the plurality of XOR gates 1106.

When a further resistor 1102 is connected to the plurality of resistors 1102 in series, the number of resistors may be even. The analog to pulse train converter 904 may further include a further comparator 1104 having a first input terminal 1110 coupled to the output terminal 1072 of the transimpedance amplifier (TIA) 1018 and a second input terminal 1112 coupled to a further connection 1114 connecting the further resistor 1102 and an adjacent resistor 1102. An output terminal 1116 of the further comparator 1104 may be coupled to the input terminal 1122 of the OR gate 1108.

In one embodiment, the analog to pulse train converter 904 may have (S+1) number of resistors, $R_1$ to $R_{S+1}$ 1102. The analog to pulse train converter 904 may have S number of thresholds, $V_{th,1}$ to $V_{th,S}$. The resistors, $R_1$ to $R_{S+1}$ 1102 may set the values of the thresholds $V_{th,1}$ to $V_{th,S}$. A top terminal 1124 of the plurality of resistors, $R_1$ to $R_{S+1}$ 1102 may be set to the highest level (VH) of the transimpedance amplifier (TIA) output, and a bottom terminal 1126 of the plurality of resistors, $R_1$ to $R_{S+1}$ 1102 may be set to the lowest level (VL) of the transimpedance amplifier (TIA) 1018 output 1072. Hence, the full scale of the analog to pulse train converter 904 may be an output swing of the transimpedance amplifier (TIA) 1018.

The instant phase calculated by the instant phase calculator 902 may be supplied to the first input terminal 1110 of each of the plurality of the comparators 1104. Each of the values of the S number of thresholds $V_{th,1}$ to $V_{th,S}$ may be supplied to the second input terminal 1112 of the respective comparator 1104. The instant phase may be compared with the values of the S number of thresholds $V_{th,1}$ to $V_{th,S}$.

Figure 12:
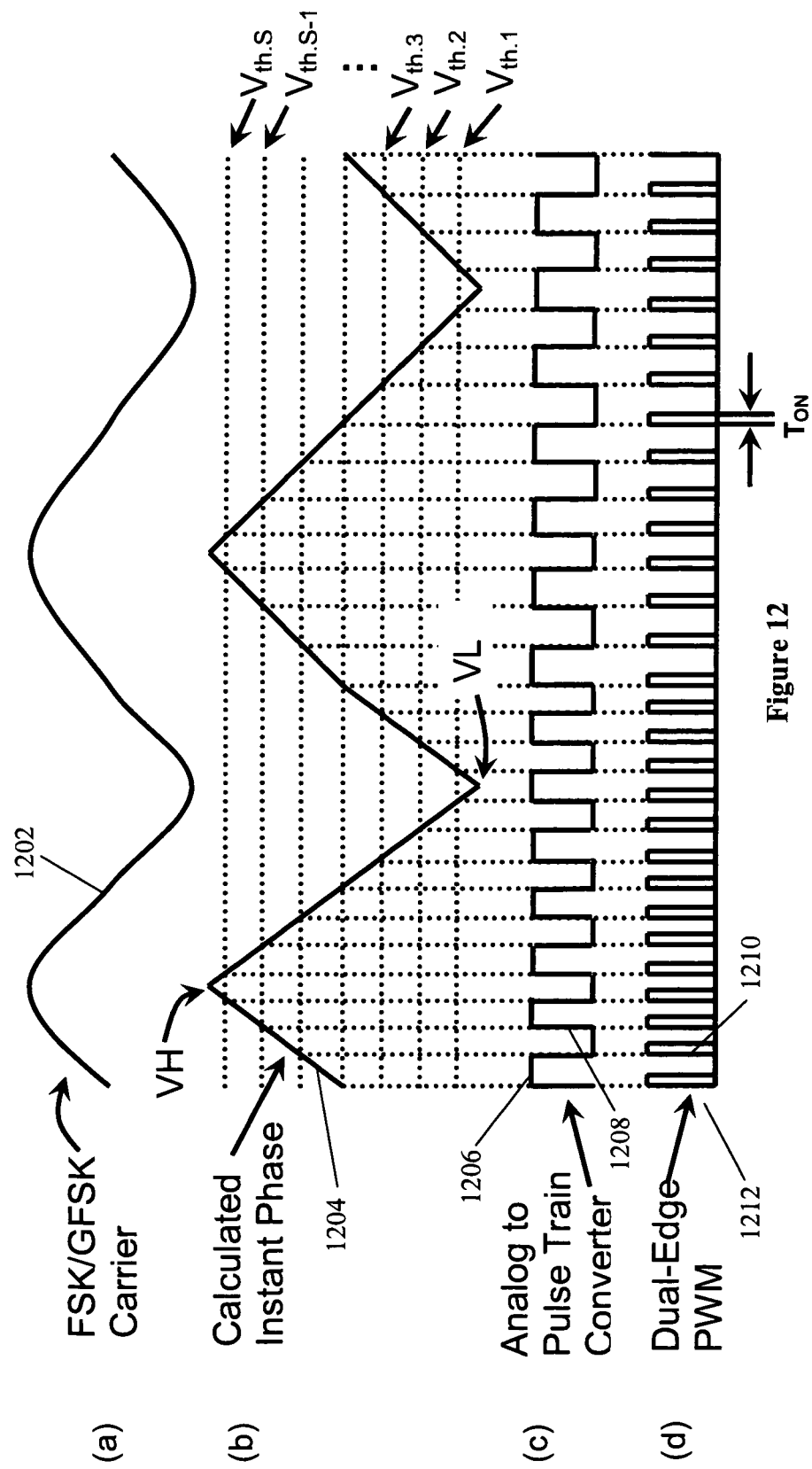
FIG. 12a shows a FSK/GFSK carrier signal.
FIG. 12b shows a waveform of a calculated instant phase of the FSK/GFSK carrier signal.
FIG. 12c shows an output pulse train of an analog to pulse train converter.
FIG. 12d shows an output signal of a pulse-width modulator.

FIG. 12a shows a FSK/GFSK carrier signal 1202. The FSK/GFSK carrier signal 1202 may be converted into the instant phase by the instant phase calculator 902. FIG. 12b shows a waveform 1204 of the calculated instant phase of the FSK/GFSK carrier signal 1202. The peak and valley values of the calculated instant phase of the FSK/GFSK carrier signal 1202 may be set to VH and VL respectively. The S number of thresholds $V_{th,1}$ to $V_{th,S}$ may be set by:

$$V_{th,S}-V_{th,S-1}=V_{th,S-1}-V_{th,S-2}=\ldots=V_{th,2}-V_{th,1}=\Delta V; \text{ and} \quad 1)$$

$$VH-V_{th,S}=V_{th,1}-VL=\Delta V/2. \quad 2)$$

These thresholds may ensure that threshold comparison events are distributed evenly in a phase domain.

The comparison results of the instant phase of the FSK/GFSK carrier signal 1202 with the values of the S number of thresholds $V_{th,1}$ to $V_{th,S}$ may be converted into a pulse train by the analog to pulse train converter 904. FIG. 12c shows the pulse train 1206. Each transition edge 1208 of the pulse train 1206 may have a corresponding threshold comparison event. A frequency of the pulse train 1206 may be S times of a frequency of the FSK/GFSK carrier signal 1202.

As shown in FIG. 4 and as described above, the output terminal 436 of the zero-crossing detector 434 may be coupled to the input terminal 438 of the pulse-width modulator 412. The pulse train 1206 may be supplied to the pulse-width modulator 412. The pulse-width modulator 412 may detect the transition edges 1208 of the pulse train 1206, and may output a positive pulse 1210 at each transition edge 1208. FIG. 12d shows an output signal 1212 of the pulse-width modulator 412.

Figure 13:
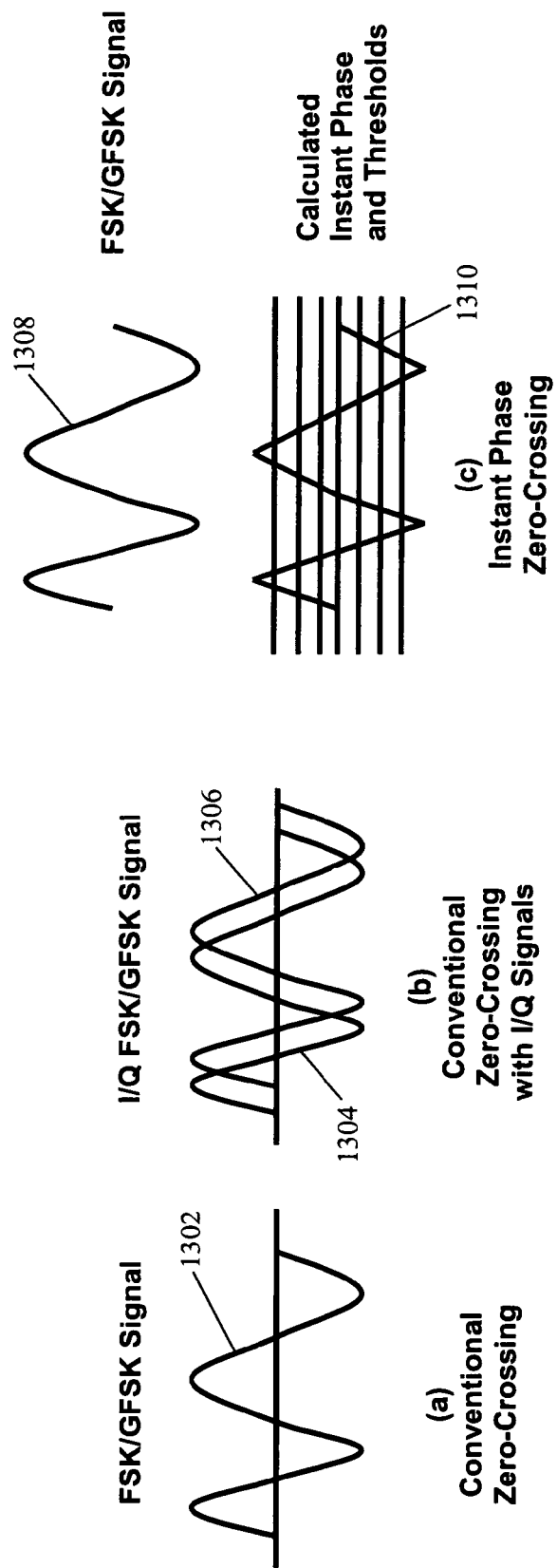
FIG. 13a illustrates a FSK/GFSK carrier signal processed by a conventional zero-crossing method.
FIG. 13b shows I/Q FSK/GFSK signals processed by the conventional zero-crossing method.
FIG. 13c shows a FSK/GFSK carrier signal processed by an instant phase zero-crossing method in one embodiment.

FIG. 13a illustrates a FSK/GFSK carrier signal 1302 processed by a conventional zero-crossing method. The conventional zero-crossing method performs zero-crossing detection on the FSK/GFSK carrier signal 1302 directly. The phase accuracy may be 180 degrees.

FIG. 13b shows I/Q FSK/GFSK signals 1304, 1306 processed by the conventional zero-crossing method. The conventional zero-crossing method performs zero-crossing detection on the I/Q carrier signals 1304, 1306 directly. The phase accuracy may be 90 degrees.

FIG. 13c shows a FSK/GFSK carrier signal 1308 processed by an instant phase zero-crossing method in one embodiment. Comparison may be performed on the phase of the carrier signal 1308 instead of the carrier signal 1308. A calculated instant phase 1310 may have a large and stable swing, which may be suitable for multi-threshold digitalization. Hence, the phase accuracy may be improved compared to the conventional zero-crossing method.

Referring back to FIG. 4, the demodulator 400 may be operable in different modes of demodulation, which may include one or more of a group consisting of amplitude shift keying (ASK) mode, frequency shift keying (FSK) mode, controllable weight amplitude frequency shift keying (CW-AFSK) mode and dual channel amplitude frequency shift keying (DC-AFSK) mode.

Figure 14:
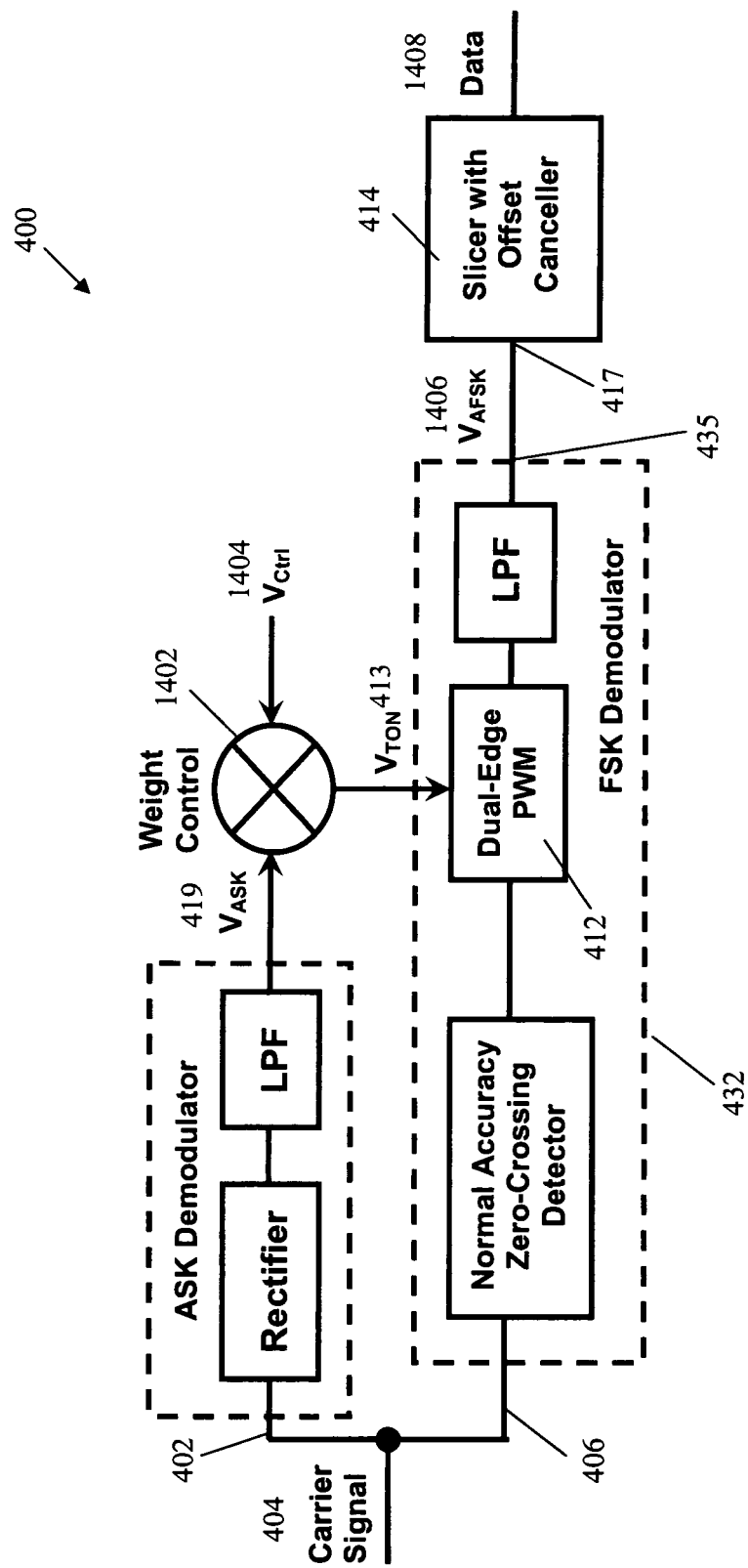
FIG. 14 shows a schematic diagram of the demodulator of FIG. 4 in the controllable weight amplitude frequency shift keying (CW-AFSK) mode.

FIG. 14 shows a schematic diagram of the demodulator 400 in the controllable weight amplitude frequency shift keying (CW-AFSK) mode. When the demodulator 400 is operated in the CW-AFSK mode, the mode control unit 408 may be adapted to control the pulse-width modulator 412 in dependence on an output signal, e.g. $V_{ASK}$ 419 of the amplitude demodulating path 402. The mode control unit 408 may be adapted to couple the output terminal 435 of the frequency shift keying demodulating unit 432 to the input terminal 417 of the slicer 414. The mode control unit 408 may be adapted to provide a scaling device 1402 to receive the output signal, e.g. $V_{ASK}$ 419 of the amplitude demodulating path 402, to scale the output signal, e.g. $V_{ASK}$ 419 of the amplitude demodulating path 402 and to supply the scaled output signal, e.g. $V_{TON}$ 413 of the amplitude demodulating path 402 to the pulse-width modulator 412. The pulse-width modulator 412 may be controlled by the scaled output signal, e.g. $V_{TON}$ 413. The scaling device 1402 may be adapted to scale the output signal, e.g. $V_{ASK}$ 419 of the amplitude demodulating path 402 by multiplying the output signal, e.g. $V_{ASK}$ 419 of the amplitude demodulating path 402 with a control signal $V_{ctrl}$ 1404 received by the scaling device 1402. The scaling device 1402 may be an analog multiplier. The frequency shift keying demodulating unit 432 may generate a signal $V_{AFSK}$ 1406. The slicer may slice the signal $V_{AFSK}$ 1406 and generate a final demodulated output data 1408.

In the CW-AFSK mode, the carrier signal 404 may be AFSK-I signal, which may have the same carrier signal 404 modulated in both the amplitude demodulating path 402 and the frequency demodulating path 406. Through the pulse-width modulator 412, the amplitude information, e.g. $V_{ASK}$ 419, may be combined into the demodulation of the frequency information, e.g. $V_{FSK}$ 433. The combination of the amplitude information into the demodulation of the frequency information can be an enhancing process and may be weighted by the scaling device 1402. Thus, the demodulation of e.g. an AFSK-I signal is controllable weight amplitude frequency shift keying (CW-AFSK) demodulation method.

Based on this combination, the demodulator 400 in the CW-AFSK mode can demodulate all the ASK, FSK and AFSK-I signals. Thus, the modulator 100 can switch the modulation schemes instantly and the demodulator 400 can demodulate the signals without interrupt. The demodulator 400 in the CW-AFSK mode can be used for the applications which have wide working environment variations, need rapid reconnection on the modulation scheme changes or need continuous connection during modulation scheme changes (e.g. wireless personal medical devices).

Figure 15:
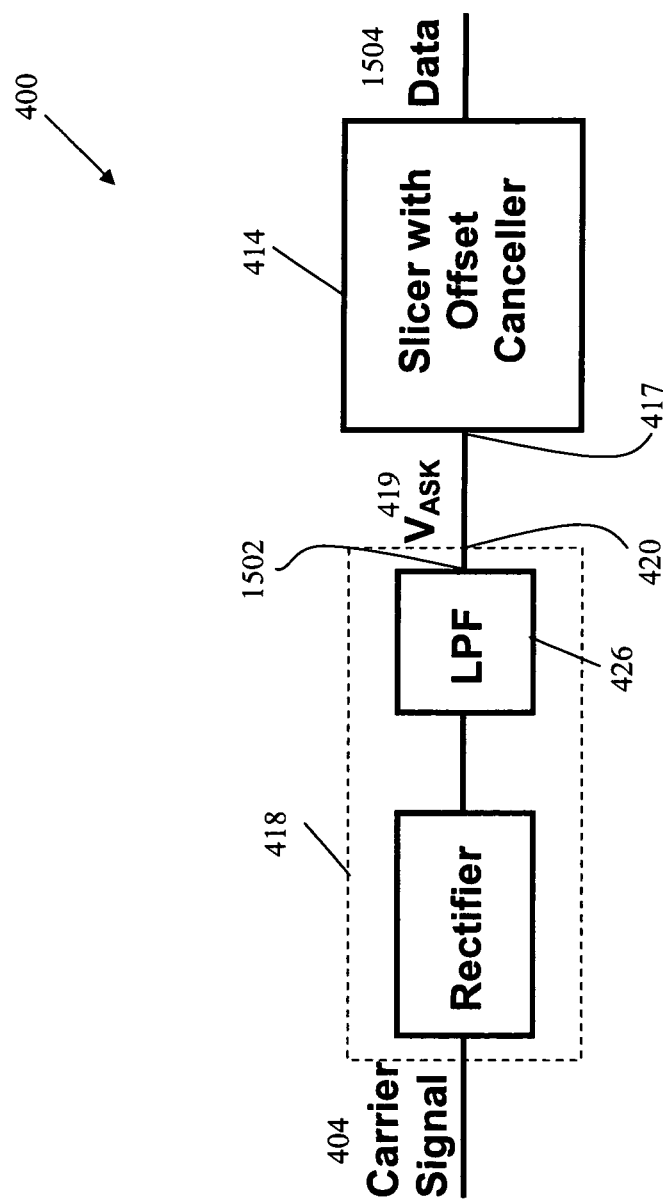
FIG. 15 shows a schematic diagram of the demodulator of FIG. 4 in amplitude shift keying (ASK) mode.

FIG. 15 shows a schematic diagram of the demodulator 400 in the amplitude shift keying (ASK) mode. When the demodulator 400 is operated in the ASK mode, the mode control unit 408 may be adapted to couple the output terminal 420 of the amplitude shift keying demodulating unit 418 to the input terminal 417 of the slicer 414 and to deactivate the frequency shift keying demodulating unit 432. An output terminal 1502 of the filter 426 may be coupled to the input terminal 417 of the slicer 414.

In the ASK mode, the carrier signal 404 may be a ASK signal. The carrier signal amplitude envelope $V_{ASK}$ 419 may be extracted from the carrier signal 404 and may be supplied from the filter 426 to the slicer 414 for data decision. The slicer may generate a final demodulated output data 1504.

Figure 16:
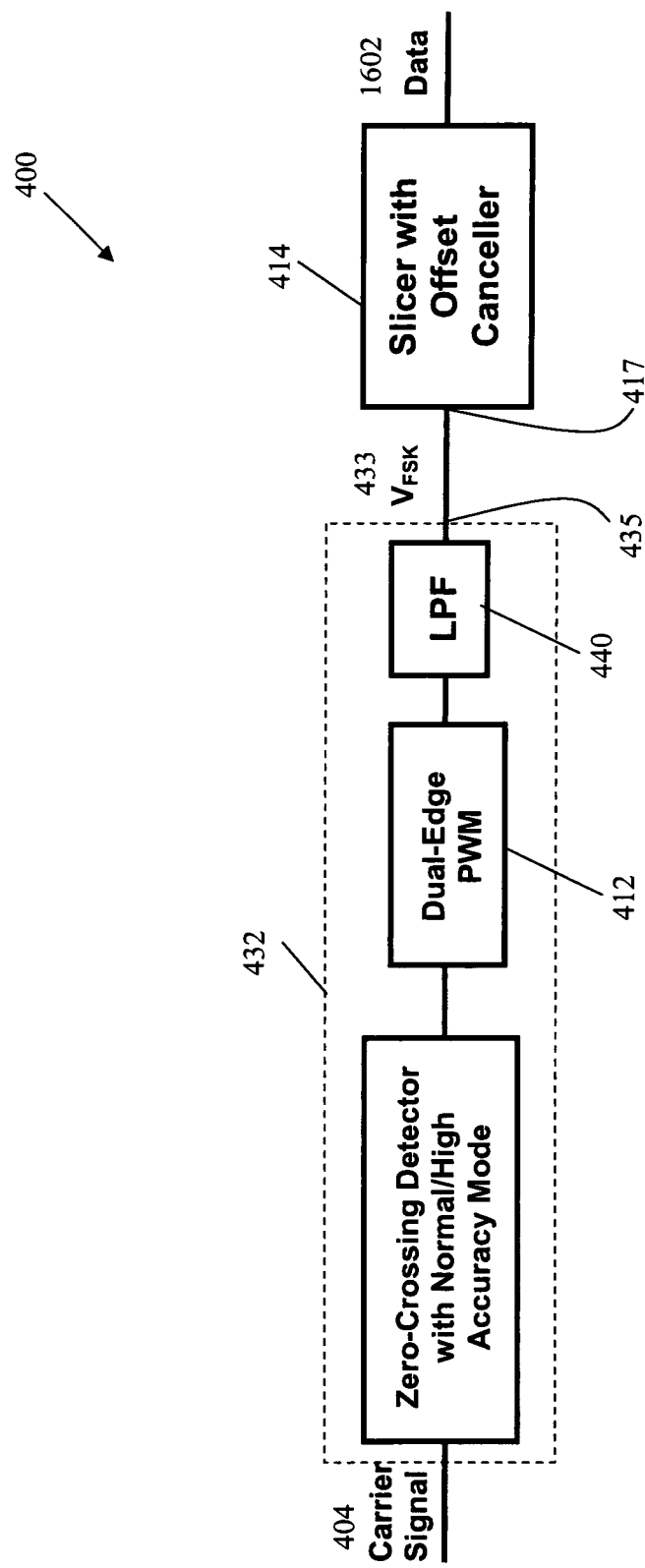
FIG. 16 shows a schematic diagram of the demodulator of FIG. 4 in frequency shift keying (FSK) mode.

FIG. 16 shows a schematic diagram of the demodulator 400 in the frequency shift keying (FSK) mode. When the demodulator 400 is operated in the FSK mode, the mode control unit 408 may be adapted to couple the output terminal 435 of the frequency shift keying demodulating unit 432 to the input terminal 417 of the slicer 414 and to deactivate the amplitude shift keying demodulating unit 418. The pulse-width control signal $V_{TON}$ 413 supplied to the pulse-width modulator 412 may be set to a suitable constant value by the mode control unit 408.

In the FSK mode the carrier signal 404 may be a FSK or a GFSK signal. The frequency shift keying demodulating unit 432 may convert the frequency of the carrier signal 404 into the signal $V_{FSK}$ 433. The signal $V_{FSK}$ 433 may be supplied from the frequency shift keying demodulating unit 432 to the slicer 414 for data decision. The slicer 414 may slice an output signal, e.g. $V_{FSK}$ 433 of the filter 440 to generate a final demodulated output data 1602.

Figure 17:
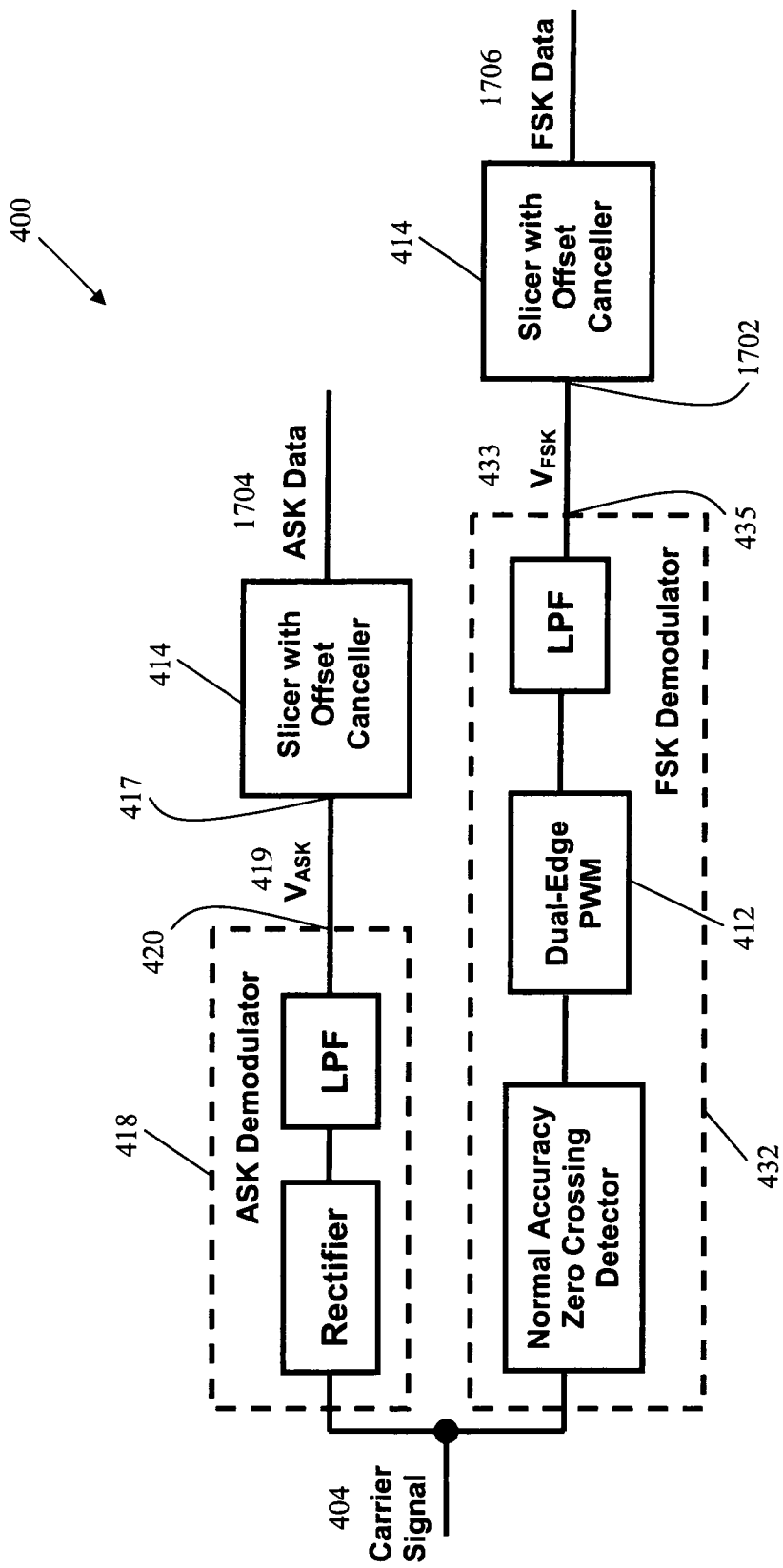
FIG. 17 shows a schematic diagram of the demodulator of FIG. 4 in the dual channel amplitude frequency shift keying (DC-AFSK) mode.

FIG. 17 shows a schematic diagram of the demodulator 400 in the dual channel amplitude frequency shift keying (DC-AFSK) mode. When the demodulator 400 is operated in the DC-AFSK mode, the demodulator 400 may use a further slicer 414. The mode control unit 408 may be adapted to couple the output terminal 420 of the amplitude shift keying demodulating unit 418 to the input terminal 417 of the slicer 414 and couple the output terminal 435 of the frequency shift keying demodulating unit 432 to an input terminal 1702 of the further slicer 414.

In the DC-AFSK mode, the carrier signal 404 may be the AFSK-II signal. The carrier signal 404 may be modulated in both amplitude and frequency. The amplitude modulation signal and the frequency modulation signal may be different. The carrier signal amplitude envelope $V_{ASK}$ 419 from the amplitude shift keying demodulating unit 418 may be digitalized by the slicer 414. The signal $V_{FSK}$ 433 from the frequency shift keying demodulating unit 432 may be digitalized by the further slicer 414. The slicer 414 may generate a final amplitude demodulated output data 1704 and the further slicer 414 may generate a final frequency demodulated output data 1706. The pulse-width control signal $V_{TON}$ 413 supplied to the pulse-width modulator 412 may be set to a suitable constant value by the mode control unit 408.

The demodulator 400 in the DC-AFSK mode may provide dual-channel communication, may double the channel efficiency and may reduce the power per bit. The demodulator 400 may achieve high spectrum efficiency with low power and low cost. Further, the demodulator 400 in the DC-AFSK mode can be used for wireless communication which needs ultra low power consumption (e.g. wireless personal area networks, wireless body area network etc.).

Figure 18:
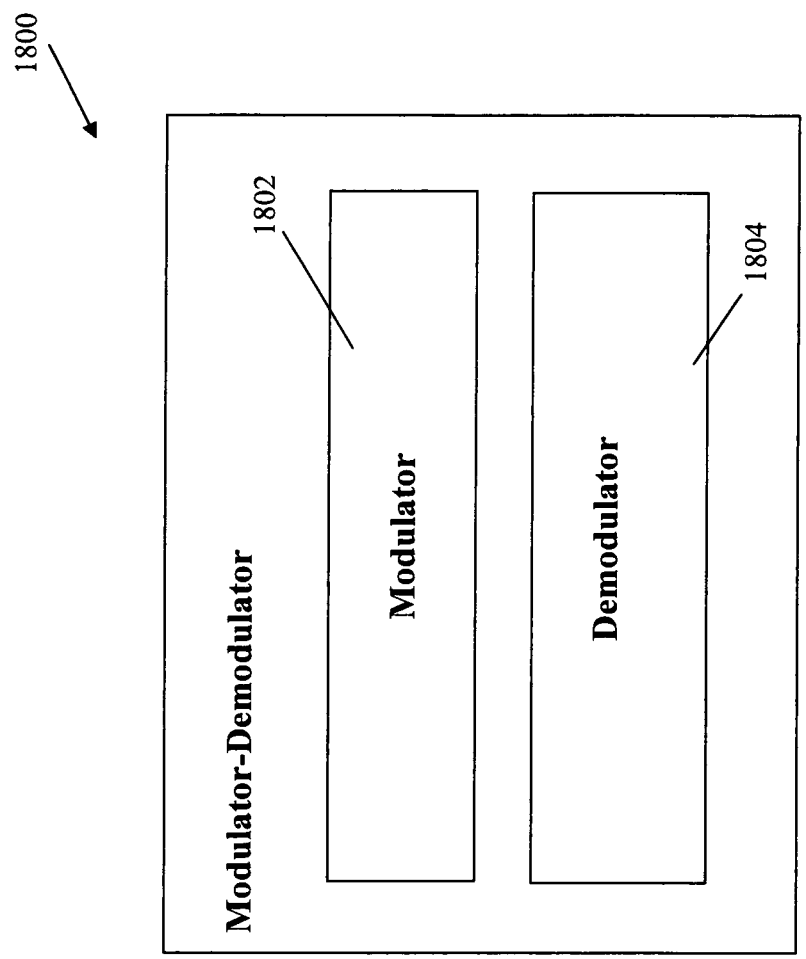
FIG. 18 shows a schematic diagram of a modulator-demodulator (modem).

FIG. 18 shows a schematic diagram of a modulator-demodulator (modem) 1800. The modem 1800 may include a modulator 1802. The modulator 1802 may be similar to the modulator 100 as described above. The modem 1800 may include a demodulator 1804. The demodulator 1804 may be similar to the demodulator 400 as described above. The modem 1800 can be used for most short range wireless networks (e.g. wireless personal area networks, wireless body area networks, Bluetooth, etc.).

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

In one embodiment, a modulator may include a first intermediate signal processing path adapted to route a first intermediate signal; a second intermediate signal processing path adapted to route a second intermediate signal; a first amplifier coupled into the first intermediate signal processing path; a second amplifier coupled into the second intermediate signal processing path; and a chopper circuit coupled into the first intermediate signal processing path; wherein the chopper circuit is adapted to process the first intermediate signal in dependence on first baseband data; wherein the first amplifier is adapted to amplify the first intermediate signal processed by the chopper circuit in dependence on second baseband data; and wherein the second amplifier is adapted to amplify the second intermediate signal in dependence on the second baseband data.

In one embodiment, the modulator may be adapted to operate in different modes of modulation in dependence on the first baseband data and the second baseband data.

In one embodiment, the modes of modulation may include one or more of a group consisting of amplitude shift keying (ASK) mode, frequency shift keying (FSK) mode, controllable weight amplitude frequency shift keying (CW-AFSK) mode, and dual channel amplitude frequency shift keying (DC-AFSK) mode.

In one embodiment, when the modulator is operated in the amplitude shift keying (ASK) mode, the first baseband data may have a constant value.

In one embodiment, when the modulator is operated in the frequency shift keying (FSK) mode, the second baseband data may have a constant value.

In one embodiment, when the modulator is operated in the controllable weight amplitude frequency shift keying (CW-AFSK) mode, the first baseband data and the second baseband data may be the same or may be provided by one message source.

In one embodiment, when the modulator is operated in the dual channel amplitude frequency shift keying (DC-AFSK) mode, the first baseband data and the second baseband data may have different values or may be provided by two message sources respectively.

In one embodiment, the first baseband data may have a value of 1 or −1.

In one embodiment, the second baseband data may have a value of 1 or −1.

In one embodiment, the first baseband data may be baseband frequency shift keying data.

In one embodiment, the second baseband data may be baseband amplitude shift keying data.

In one embodiment, the chopper circuit may be a differential binary phase shift keying modulator.

In one embodiment, the first intermediate signal processing path may include a first filter, an output terminal of the first filter being coupled to an input terminal of the chopper circuit.

In one embodiment, the first filter may be a low pass filter.

In one embodiment, the second intermediate signal processing path may include a second filter, an output terminal of the second filter being coupled to an input terminal of the second amplifier.

In one embodiment, the second filter may be a low pass filter.

In one embodiment, the modulator may further include a frequency divider, a first output terminal of the frequency divider being coupled to an input terminal of the first filter, and a second output terminal of the frequency divider being coupled to an input terminal of the second filter.

In one embodiment, the frequency divider may be a current mode logic modular-2 frequency divider or a D flip flop frequency divider, the current mode logic modular-2 frequency divider or the D flip flop frequency divider being adapted to provide quadrature complementary (positive and negative) outputs.

In one embodiment, the first intermediate signal processing path may include a first scaling device coupled to an output terminal of the first amplifier, the first scaling device being adapted to scale the first intermediate signal amplified by the first amplifier.

In one embodiment, the first scaling device may be adapted to scale the first intermediate signal by multiplying the first intermediate signal with an input signal received by the first scaling device.

In one embodiment, the first scaling device may be a first output of a quadrature local oscillator.

In one embodiment, the second intermediate signal processing path may include a second scaling device coupled to an output terminal of the second amplifier, the second scaling device being adapted to scale the second intermediate signal amplified by the second amplifier.

In one embodiment, the second scaling device may be adapted to scale the second intermediate signal by multiplying the second intermediate signal with an input signal received by the second scaling device.

In one embodiment, the second scaling device may be a second output of the quadrature local oscillator.

In one embodiment, the modulator may further include a summing device coupled to an output terminal of the first scaling device and an output terminal of the second scaling device, the summing device being adapted to combine the first intermediate signal scaled by the first scaling device and the second intermediate signal scaled by the second scaling device.

In one embodiment, a combination of the first intermediate signal and the second intermediate signal may form a modulated signal.

In one embodiment, an output terminal of the summing device may be coupled to an input terminal of a power amplifier, the power amplifier being adapted to amplify the modulated signal.

In one embodiment, a demodulator may include an amplitude demodulating path adapted to route a carrier signal; a frequency demodulating path adapted to route the same carrier signal; a mode control unit coupled to an output terminal of the amplitude demodulating path and an output terminal of the frequency demodulating path; and a pulse-width modulator coupled into the frequency demodulating path; wherein the mode control unit may be adapted to control different modes of demodulation; and wherein, when the demodulator is operated in a controllable weight amplitude frequency shift keying (CW-AFSK) mode, the mode control unit may be adapted to control the pulse-width of the pulse-width modulator in dependence on an output signal of the amplitude demodulating path.

In one embodiment, the amplitude demodulating path may include an amplitude shift keying demodulating unit, an output terminal of the amplitude shift keying demodulating unit being coupled to an input terminal of the mode control unit.

In one embodiment, the frequency demodulating path may include a frequency shift keying demodulating unit, the frequency shift keying demodulating unit including the pulse-width modulator.

In one embodiment, the demodulator may further include a slicer coupled to an output terminal of the mode control unit.

In one embodiment, the slicer may have an efficient DC offset canceller, a peak detector and a valley detector; wherein the efficient DC offset canceller may be implemented based on DC offset cancellation loop (DC offset feedback loop) or implemented based on dynamically setting a threshold of the slicer to a mean value of an input signal of the slicer; wherein the input signal of the slicer may be supplied to the peak detector and the valley detector; and wherein the mean value of the input signal of the slicer may be an average signal of an output of the peak detector and an output of the valley detector.

In one embodiment, when the demodulator is operated in controllable weight amplitude frequency shift keying (CW-AFSK) mode, the mode control unit may be adapted to provide a scaling device to receive the output signal of the amplitude demodulating path, to scale the output signal of the amplitude demodulating path and to supply the scaled output signal of the amplitude demodulating path to the pulse-width modulator, the pulse-width of the pulse-width modulator being controlled by the scaled output signal of the amplitude demodulating path.

In one embodiment, the scaling device may be adapted to scale the output signal of the amplitude demodulating path by multiplying the output signal of the amplitude demodulating path with a control signal received by the scaling device.

In one embodiment, the modes of demodulation may further include one or more of a group consisting of amplitude shift keying (ASK) mode, frequency shift keying (FSK) mode, and dual channel amplitude frequency shift keying (DC-AFSK) mode.

In one embodiment, when the demodulator is operated in controllable weight amplitude frequency shift keying (CW-AFSK) mode, the mode control unit may be adapted to couple an output terminal of the frequency shift keying demodulating unit to an input terminal of the slicer.

In one embodiment, when the demodulator is operated in the amplitude shift keying (ASK) mode, the mode control unit may be adapted to couple the output terminal of the amplitude shift keying demodulating unit to the input terminal of the slicer and to deactivate the frequency shift keying demodulating unit.

In one embodiment, the amplitude shift keying demodulating unit may include a rectifier and a filter, an input terminal of the filter being coupled to an output terminal of the rectifier.

In one embodiment, the rectifier of the amplitude shift keying demodulating unit may be a full wave rectifier.

In one embodiment, the rectifier of the amplitude shift keying demodulator may include a first half wave transconductance rectifier having a first input terminal, a second input terminal, and an output terminal; and a second half wave transconductance rectifier having a first input terminal, a second input terminal, and an output terminal; wherein the first input terminal of the first half wave transconductance rectifier may be coupled to the second input terminal of the second half wave transconductance rectifier; wherein the second input terminal of the first half wave transconductance rectifier may be coupled to the first input terminal of the second half wave transconductance rectifier; and wherein the output terminal of the first half wave transconductance rectifier may be coupled to the output terminal of the second half wave transconductance rectifier.

In one embodiment, the first half wave transconductance rectifier may include a first to sixth transistor (M1 to M6), a first to fourth current source ($I_A$ to $I_D$), a polarized capacitor ($C_1$) and a resistor (R); wherein the first transistor (M1) may include a gate terminal operable as the first input terminal of the first half wave transconductance rectifier, a source terminal coupled to a drain terminal of the sixth transistor (M6), and a drain terminal coupled to a gate terminal of the fifth transistor (M5) and an input terminal of the third current source ($I_C$); wherein the second transistor (M2) may include a gate terminal operable as the second input terminal of the first half wave transconductance rectifier, a source terminal coupled to an output terminal of the second current source ($I_B$) and a drain terminal of the third transistor (M3), and a drain terminal coupled to a gate terminal of the third transistor (M3), a gate terminal of the fourth transistor (M4), an input terminal of the first current source ($I_A$); wherein the third transistor (M3) may include a source terminal coupled to ground, a source terminal of the fourth transistor (M4), a drain terminal of the fifth transistor (M5), an output terminal of the first current source ($I_A$) and an output terminal of the third current source ($I_C$); wherein the fourth transistor (M4) may include a drain terminal operable as the output terminal of the first half wave transconductance rectifier; wherein the fifth transistor (M5) may include a source terminal coupled to a gate terminal of the sixth transistor (M6), an output terminal of the fourth current source ($I_D$) and a negative polarity end of the polarized capacitor ($C_1$); wherein the sixth transistor (M6) may include a source terminal coupled to a supply voltage of the first half wave transconductance rectifier, an input terminal of the second current source ($I_B$), an input terminal of the fourth current source ($I_D$) and a positive polarity end of the polarized capacitor ($C_1$); and wherein the resistor (R) may be coupled between the source terminal of the first transistor (M1) and the drain terminal of the third transistor (M3) and coupled to the source terminal of the second transistor (M2).

In one embodiment, the second half wave transconductance rectifier may include a first to sixth transistor (M1 to M6), a first to fourth current source ($I_A$ to $I_D$), a polarized capacitor ($C_1$) and a resistor (R); wherein the first transistor (M1) may include a gate terminal operable as the first input terminal of the second half wave transconductance rectifier, a source terminal coupled to a drain terminal of the sixth transistor (M6), and a drain terminal coupled to a gate terminal of the fifth transistor (M5) and an input terminal of the third current source ($I_C$); wherein the second transistor (M2) may include a gate terminal operable as the second input terminal of the second half wave transconductance rectifier, a source terminal coupled to an output terminal of the second current source ($I_B$) and a drain terminal of the third transistor (M3), and a drain terminal coupled to a gate terminal of the third transistor (M3), a gate terminal of the fourth transistor (M4), an input terminal of the first current source ($I_A$); wherein the third transistor (M3) may include a source terminal coupled to ground, a source terminal of the fourth transistor (M4), a drain terminal of the fifth transistor (M5), an output terminal of the first current source ($I_A$) and an output terminal of the third current source ($I_C$); wherein the fourth transistor (M4) may include a drain terminal operable as the output terminal of the second half wave transconductance rectifier; wherein the fifth transistor (M5) may include a source terminal coupled to a gate terminal of the sixth transistor (M6), an output terminal of a fourth current source ($I_D$) and a negative polarity end of the polarized capacitor ($C_1$); wherein the sixth transistor (M6) may include a source terminal coupled to a supply voltage of the second half wave transconductance rectifier, an input terminal of the second current source ($I_B$), an input terminal of the fourth current source ($I_D$) and a positive polarity end of the polarized capacitor ($C_1$); and wherein the resistor (R) may be coupled between the source terminal of the first transistor (M1) and the drain terminal of the third transistor (M3) and coupled to the source terminal of the second transistor (M2).

In one embodiment, the rectifier of the amplitude shift keying demodulator may further include a load resistor and a load current source.

In one embodiment, a first end of the load resistor may be coupled to a supply voltage of the rectifier; wherein the output terminal of the first half wave transconductance rectifier and the output terminal of the second half wave transconductance rectifier may be coupled to a second end of the load resistor and an input terminal of the load current source; wherein an output terminal of the load current source may be coupled to ground.

In one embodiment, the output terminal of the first half wave transconductance rectifier and the output terminal of the second half wave transconductance rectifier may be coupled to the input terminal of the filter of the amplitude shift keying demodulating unit.

In one embodiment, the filter of the amplitude shift keying demodulating unit may be a low pass filter.

In one embodiment, when the demodulator is operated in the frequency shift keying (FSK) mode, the mode control unit may be adapted to couple an output terminal of the frequency shift keying demodulating unit to the input terminal of the slicer, to deactivate the amplitude shift keying demodulating unit, and to set a pulse-width control signal supplied to the pulse-width modulator to a suitable constant value.

In one embodiment, the frequency shift keying demodulating unit may further include a zero-crossing detector, an output terminal of the zero-crossing detector being coupled to an input terminal of the pulse-width modulator.

In one embodiment, the zero-crossing detector of the frequency shift keying demodulator may be operable in a first accuracy mode and a second accuracy mode.

In one embodiment, in the first accuracy mode, the zero-crossing detector may use a filter bank; a first comparator having a first input terminal of the first comparator coupled to a first output terminal of the filter bank, a second input terminal of the first comparator coupled to a second output terminal of the filter bank, and an output terminal; a second comparator having a first input terminal of the second comparator coupled to a third output terminal of the filter bank, a second input terminal of the second comparator coupled to a fourth output terminal of the filter bank, and an output terminal; and a XOR gate having a first input terminal coupled to the output terminal of the first comparator and a second input terminal coupled to the output terminal of the second comparator.

In one embodiment, the filter bank may be a two-stage poly phase filter.

In one embodiment, in the second accuracy mode, the zero-crossing detector may use an instant phase calculator and an analog to pulse train converter, an output terminal of the instant phase calculator being coupled to an input terminal of the analog to pulse train converter.

In one embodiment, the instant phase calculator may include a filter bank; a first transconductor having a first input terminal coupled to a first output terminal of the filter bank, a second input terminal coupled to a second output terminal of the filter bank, and an output terminal; a rectifier having a first input terminal coupled to a third output terminal of the filter bank, a second input terminal coupled to a fourth output terminal of the filter bank, and an output terminal; a peak detector having a first input terminal coupled to the third output terminal of the filter bank, a second input terminal coupled to the fourth output terminal of the filter bank, and an output terminal; a valley detector having a first input terminal coupled to the third output terminal of the filter bank, a second input terminal coupled to the fourth output terminal of the filter bank, and an output terminal; a second transconductor having a first input terminal coupled to the output terminal of the peak detector, a second input terminal coupled to the output terminal of the valley detector, and an output terminal; a summing device having a first input terminal coupled to the output terminal of the rectifier, a second input terminal coupled to the output terminal of the second transconductor, and an output terminal; a scaling device having a first input terminal coupled to the output terminal of the summing device, a second input terminal coupled to the output terminal of the first transconductor, and an output terminal; and a transimpedance amplifier having an input terminal coupled to the output terminal of the scaling device.

In one embodiment, the filter bank may be a two-stage poly phase filter.

In one embodiment, the summing device may be adapted to combine an output signal of the rectifier and an output signal of the second transconductor.

In one embodiment, the scaling device may be adapted to divide an output signal of the first transconductor by an output signal of the summing device.

In one embodiment, an output terminal of the transimpedance amplifier may be coupled to the input terminal of the analog to pulse train converter.

In one embodiment, the analog to pulse train converter may include a plurality of resistors connected in series, wherein the number of resistors may be odd; a plurality of comparators, each comparator having a first input terminal coupled to the output terminal of the transimpedance amplifier and a second input terminal coupled to an individual connection connecting two adjacent resistors of the plurality of resistors, and an output terminal; a plurality of XOR gates, each XOR gate having two input terminals and one output terminal, wherein the two input terminals of each XOR gate are coupled to outputs of two adjacent comparators; an OR gate, each input terminal of which being coupled to the output terminal of one of the plurality of XOR gates.

In one embodiment, when a further resistor is connected to the plurality of resistors in series, the analog to pulse train converter may further include a further comparator having a first input terminal coupled to the output terminal of the transimpedance amplifier and a second input terminal coupled to a further connection connecting the further resistor and an adjacent resistor.

In one embodiment, an output terminal of the further comparator may be coupled to the input terminal of the OR gate.

In one embodiment, the frequency shift keying demodulating unit may further include a filter, an input terminal of the filter being coupled to the output terminal of the pulse-width modulator.

In one embodiment, the filter may be a low pass filter.

In one embodiment, the pulse-width modulator may be implemented by digital logic circuit or capacitor charge pump based one shot circuit.

In one embodiment, when the demodulator is operated in the dual channel amplitude frequency shift keying (DC-AFSK) mode, the mode control unit may be adapted to couple the output terminal of the amplitude shift keying demodulating unit and the output terminal of the frequency shift keying demodulating unit to the input terminal of the slicer, and to set the pulse-width control signal supplied to the pulse-width modulator to a suitable constant value.

In one embodiment, a modulator-demodulator may include a modulator as described above; and a demodulator as described above.

What is claimed is:

1. A demodulator comprising:
   an amplitude demodulating path adapted to route a carrier signal;
   a frequency demodulating path adapted to route the same carrier signal;
   a mode control unit coupled to an output terminal of the amplitude demodulating path and an output terminal of the frequency demodulating path; and
   a pulse-width modulator coupled into the frequency demodulating path;
   wherein the mode control unit is adapted to control different modes of demodulation;
   wherein, when the demodulator is operated in a controllable weight amplitude frequency shift keying (CW-AFSK) mode, the mode control unit is adapted to control the pulse-width of the pulse-width modulator in dependence on an output signal of the amplitude demodulating path;
   wherein the modes of demodulation further comprise one or more of a group consisting of amplitude shift keying (ASK) mode, frequency shift keying (FSK) mode and dual channel amplitude frequency shift keying (DC-AFSK) mode.

2. The demodulator of claim 1,
   wherein the amplitude demodulating path comprises an amplitude shift keying demodulating unit, an output terminal of the amplitude shift keying demodulating unit being coupled to an input terminal of the mode control unit.

3. The demodulator of claim 2,
   wherein the frequency demodulating path comprises a frequency shift keying demodulating unit, the frequency shift keying demodulating unit comprising the pulse-width modulator.

4. The demodulator of claim 3,
   further comprising a slicer coupled to an output terminal of the mode control unit.

5. The demodulator of claim 4,
   wherein the slicer has an efficient DC offset canceller, a peak detector and a valley detector;
   wherein the efficient DC offset canceller is implemented based on DC offset cancellation loop (DC offset feedback loop) or implemented based on dynamically setting a threshold of the slicer to a mean value of an input signal of the slicer;
   wherein the input signal of the slicer is supplied to the peak detector and the valley detector; and
   wherein the mean value of the input signal of the slicer is an average signal of an output of the peak detector and an output of the valley detector.

6. The demodulator of claim 4,
   wherein, when the demodulator is operated in the controllable weight amplitude frequency shift keying (CW-AFSK) mode, the mode control unit is adapted to couple an output terminal of the frequency shift keying demodulating unit to an input terminal of the slicer.

7. The demodulator of claim 3,
   wherein the frequency shift keying demodulating unit further comprises a zero-crossing detector, an output terminal of the zero-crossing detector being coupled to an input terminal of the pulse-width modulator.

8. The demodulator of claim 7,
   wherein the zero-crossing detector of the frequency shift keying demodulator is operable in a first accuracy mode and a second accuracy mode.

9. The demodulator of claim 8,
   wherein in the first accuracy mode, the zero-crossing detector uses:
   a filter bank;
   a first comparator having a first input terminal of the first comparator coupled to a first output terminal of the filter bank, a second input terminal of the first comparator coupled to a second output terminal of the filter bank, and an output terminal;
   a second comparator having a first input terminal of the second comparator coupled to a third output terminal of the filter bank, a second input terminal of the second comparator coupled to a fourth output terminal of the filter bank, and an output terminal; and
   a XOR gate having a first input terminal coupled to the output terminal of the first comparator and a second input terminal coupled to the output terminal of the second comparator.

10. The demodulator of claim 8,
    wherein in the second accuracy mode, the zero-crossing detector uses an instant phase calculator and an analog to pulse train converter, an output terminal of the instant phase calculator being coupled to an input terminal of the analog to pulse train converter.

11. The demodulator of claim 10,
    wherein the instant phase calculator comprises:
    a filter bank;
    a first transconductor having a first input terminal coupled to a first output terminal of the filter bank, a second input terminal coupled to a second output terminal of the filter bank, and an output terminal;
    a rectifier having a first input terminal coupled to a third output terminal of the filter bank, a second input terminal coupled to a fourth output terminal of the filter bank, and an output terminal;
    a peak detector having a first input terminal coupled to the third output terminal of the filter bank, a second input terminal coupled to the fourth output terminal of the filter bank, and an output terminal;
    a valley detector having a first input terminal coupled to the third output terminal of the filter bank, a second input terminal coupled to the fourth output terminal of the filter bank, and an output terminal;
    a second transconductor having a first input terminal coupled to the output terminal of the peak detector, a second input terminal coupled to the output terminal of the valley detector, and an output terminal;
    a summing device having a first input terminal coupled to the output terminal of the rectifier, a second input terminal coupled to the output terminal of the second transconductor, and an output terminal;
a scaling device having a first input terminal coupled to the output terminal of the summing device, a second input terminal coupled to the output terminal of the first transconductor, and an output terminal; and
a transimpedance amplifier having an input terminal coupled to the output terminal of the scaling device, and an output terminal coupled to the input terminal of the analog to pulse train converter.

12. The demodulator of claim 11,
wherein the summing device is adapted to combine an output signal of the rectifier and an output signal of the second transconductor;
wherein the scaling device is adapted to divide an output signal of the first transconductor by an output signal of the summing device.

13. The demodulator of claim 11,
wherein the analog to pulse train converter comprises:
a plurality of resistors connected in series, wherein the number of resistors is odd;
a plurality of comparators, each comparator having a first input terminal coupled to the output terminal of the transimpedance amplifier and a second input terminal coupled to an individual connection connecting two adjacent resistors of the plurality of resistors, and an output terminal;
a plurality of XOR gates, each XOR gate having two input terminals and one output terminal, wherein the two input terminals of each XOR gate are coupled to outputs of two adjacent comparators;
an OR gate, each input terminal of which being coupled to the output terminal of one of the plurality of XOR gates.

14. The demodulator of claim 13,
wherein, when a further resistor is connected to the plurality of resistors in series, the analog to pulse train converter further comprises a further comparator having a first input terminal coupled to the output terminal of the transimpedance amplifier, and a second input terminal coupled to a further connection connecting the further resistor and an adjacent resistor, and an output terminal coupled to the input terminal of the OR gate.

15. The demodulator of claim 3,
wherein the frequency shift keying demodulating unit further comprises a filter, an input terminal of the filter being coupled to the output terminal of the pulse-width modulator.

16. The demodulator of claim 1,
wherein, when the demodulator is operated in the controllable weight amplitude frequency shift keying (CW-AFSK) mode, the mode control unit is adapted to provide a scaling device to receive the output signal of the amplitude demodulating path, to scale the output signal of the amplitude demodulating path and to supply the scaled output signal of the amplitude demodulating path to the pulse-width modulator, the pulse-width of the pulse-width modulator being controlled by the scaled output signal of the amplitude demodulating path.

17. The demodulator of claim 16,
wherein the scaling device is adapted to scale the output signal of the amplitude demodulating path by multiplying the output signal of the amplitude demodulating path with a control signal received by the scaling device.

18. The demodulator of claim 1,
wherein, when the demodulator is operated in the amplitude shift keying (ASK) mode, the mode control unit is adapted to couple the output terminal of the amplitude shift keying demodulating unit to the input terminal of the slicer and to deactivate the frequency shift keying demodulating unit.

19. The demodulator of claim 18,
wherein the amplitude shift keying demodulating unit comprises a rectifier and a filter, an input terminal of the filter being coupled to an output terminal of the rectifier.

20. The demodulator of claim 19,
wherein the rectifier of the amplitude shift keying demodulator comprises:
a first half wave transconductance rectifier having a first input terminal, a second input terminal, and an output terminal; and
a second half wave transconductance rectifier having a first input terminal, a second input terminal, and an output terminal;
wherein the first input terminal of the first half wave transconductance rectifier is coupled to the second input terminal of the second half wave transconductance rectifier;
wherein the second input terminal of the first half wave transconductance rectifier is coupled to the first input terminal of the second half wave transconductance rectifier; and
wherein the output terminal of the first half wave transconductance rectifier is coupled to the output terminal of the second half wave transconductance rectifier.

21. The demodulator of claim 20,
wherein the rectifier of the amplitude shift keying demodulator further comprises a load resistor and a load current source;
wherein a first end of the load resistor is coupled to a supply voltage of the rectifier;
wherein the output terminal of the first half wave transconductance rectifier and the output terminal of the second half wave transconductance rectifier are coupled to a second end of the load resistor and an input terminal of the load current source;
wherein an output terminal of the load current source is coupled to ground;
wherein the output terminal of the first half wave transconductance rectifier and the output terminal of the second half wave transconductance rectifier are coupled to the input terminal of the filter of the amplitude shift keying demodulating unit.

22. The demodulator of claim 1,
wherein, when the demodulator is operated in the frequency shift keying (FSK) mode, the mode control unit is adapted to couple an output terminal of the frequency shift keying demodulating unit to the input terminal of the slicer, to deactivate the amplitude shift keying demodulating unit, and to set a pulse-width control signal supplied to the pulse-width modulator to a suitable constant value.

23. The demodulator of claim 1,
wherein, when the demodulator is operated in the dual channel amplitude frequency shift keying (DC-AFSK) mode, the mode control unit is adapted to couple the output terminal of the amplitude shift keying demodulating unit and the output terminal of the frequency shift keying demodulating unit to the input terminal of the slicer, and to set the pulse-width control signal supplied to the pulse-width modulator to a suitable constant value.

* * * * *

UNITED STATES PATENT AND TRADEMARK OFFICE
CERTIFICATE OF CORRECTION

PATENT NO. : 8,629,716 B2  Page 1 of 1
APPLICATION NO. : 13/119823
DATED : January 14, 2014
INVENTOR(S) : Han et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 123 days.

Signed and Sealed this
Twenty-second Day of September, 2015

Michelle K. Lee
*Director of the United States Patent and Trademark Office*